(12) United States Patent
Sirault et al.

(10) Patent No.: US 9,741,128 B2
(45) Date of Patent: Aug. 22, 2017

(54) METHOD AND SYSTEM FOR CHARACTERIZING PLAN PHENOTYPE

(71) Applicant: Commonwealth Scientific and Industrial Research Organisation, Campbell, ACT (AU)

(72) Inventors: Xavier Raymond Richard Sirault, Canberra (AU); Jurgen Fripp, Herston (AU); Anthony Paproki, Herston (AU)

(73) Assignee: Commonwealth Scientific and Industrial Research Organisation (AU)

( * ) Notice: Subject to any disclaimer, the term of this patent is extended or adjusted under 35 U.S.C. 154(b) by 9 days.

(21) Appl. No.: 14/362,977

(22) PCT Filed: Dec. 5, 2012

(86) PCT No.: PCT/AU2012/001476
§ 371 (c)(1),
(2) Date: Jun. 5, 2014

(87) PCT Pub. No.: WO2013/082648
PCT Pub. Date: Jun. 13, 2013

(65) Prior Publication Data
US 2014/0294247 A1    Oct. 2, 2014

(30) Foreign Application Priority Data

Dec. 5, 2011    (AU) .............................. 2011905053

(51) Int. Cl.
*G06K 9/00*    (2006.01)
*G06T 7/00*    (2017.01)
(Continued)

(52) U.S. Cl.
CPC .............. *G06T 7/0091* (2013.01); *G06K 9/00* (2013.01); *G06K 9/00214* (2013.01);
(Continued)

(58) Field of Classification Search
CPC ..... G06T 7/0081; G06T 7/0083; G06T 17/20; G06T 17/00; G06T 15/00; G06T 7/0022; G06K 9/34
See application file for complete search history.

(56) References Cited

U.S. PATENT DOCUMENTS 5,253,302 A * 10/1993 Massen .................... B07C 5/10
                                                        348/47
6,553,337 B1    4/2003 Lounsbery
(Continued)

OTHER PUBLICATIONS

Dornbusch, Tino, Peter Wernecke, and Wulf Diepenbrock. "A method to extract morphological traits of plant organs from 3D point clouds as a database for an architectural plant model." Ecological Modelling 200.1 (2007): 119-129.*
(Continued)

*Primary Examiner* — Jonathan S Lee
(74) *Attorney, Agent, or Firm* — Merchant & Gould P.C.

(57) ABSTRACT

The present disclosure provides a computer-implemented method of, and system for, characterizing the phenotype of a plant. The method includes: (i) obtaining mesh data representing a surface of the plant, said mesh data including data representing a plurality of polygons having respective sets of vertices, each vertex having a spatial coordinate; and (ii) applying at least two segmentations of progressively finer resolution to the mesh data to assign the vertices to distinct morphological regions of the plant.

37 Claims, 16 Drawing Sheets

(51) Int. Cl.
  *G06T 17/20* (2006.01)
  *G06K 9/34* (2006.01)
  *G06T 7/12* (2017.01)
(52) U.S. Cl.
  CPC .............. *G06K 9/342* (2013.01); *G06T 7/12* (2017.01); *G06T 17/20* (2013.01)

(56) References Cited

U.S. PATENT DOCUMENTS

| | | | | |
|---|---|---|---|---|
| 2006/0110037 | A1* | 5/2006 | Kaus | G06T 7/149 382/173 |
| 2008/0304744 | A1* | 12/2008 | Peters | G06T 7/0083 382/173 |
| 2012/0306875 | A1* | 12/2012 | Cai | G06T 9/001 345/420 |
| 2013/0235183 | A1* | 9/2013 | Redden | G06K 9/2036 348/89 |
| 2015/0015697 | A1* | 1/2015 | Redden | G01N 33/0098 348/89 |

OTHER PUBLICATIONS

Lu, Shenglian, Chunjiang Zhao, and Xinyu Guo. "Venation skeleton-based modeling plant leaf wilting." International Journal of Computer Games Technology 2009 (2009): 1.*
Maierhofer, Stefan. Rule-based mesh growing and generalized subdivision meshes. Diss. Maierhofer, 2002.*
Nguyen, Thuy Tuong, et al. "Structured light-based 3D reconstruction system for plants." Sensors 15.8 (2015): 18587-18612.*
Paproki, Anthony, et al. "A novel mesh processing based technique for 3D plant analysis." BMC Plant Biology 12.1 (2012): 63.*
Paproki, Anthony, et al. "Automated 3D segmentation and analysis of cotton plants." Digital Image Computing Techniques and Applications (DICTA), 2011 International Conference on. IEEE, 2011.*
Vos, J., et al. "Functional-structural plant modelling: a new versatile tool in crop science." Journal of experimental Botany (2009): erp345.*
Wang, Jian, Xianyin Zeng, and Jianbing Liu. "Three-dimensional modeling of tea-shoots using images and models." Sensors 11.4 (2011): 3803-3815.*
Yan, Dong-Ming, et al. "Efficient and robust tree model reconstruction from laser scanned data points." Proceedings of the 11th IEEE International conference on Computer-Aided Design and Computer Graphics. 2009.*
Zamuda, Aleš, et al. "Differential evolution for parameterized procedural woody plant models reconstruction." Applied Soft Computing 11.8 (2011): 4904-4912.*
International Search Report for International Patent Application No. PCT/AU2012/001476 (mailed Jan. 21, 2013).
Eberius et al., "High-Throughput Plant Phenotyping—Data Acquisition, Transformation, and Analysis," Bioinformatics: Tools and Applications, pp. 259-278 (2009).
Granier et al., "Phenopsis, an automated platform for reproducible phenotyping of plant responses to soil water deficit in Arabidopsis thaliana permitted the identification of an accession with low sensitivity to soil water deficit," *New Phytologist*, 169(3): 623-635 (2006).
Walter et al., "Dynamics of seedling growth acclimation towards altered light conditions can be quantified via Growscreen: a setup and procedure designed for rapid optical phenotyping of different plant species," *New Phytologist*, 174(2):447-455 (2007).
Bylesjö et al., "Lamina: a tool for rapid quantification of leaf size and shape parameters," *BMC Plant Biology*, 8:82, pp. 1-9 (2008).
Naeem et al., "High-throughput feature counting and measurement of roots," *Bioinformatics*, 27(9):1337-1338 (2011).

Iyer-Pascuzzi et al., "Imaging and Analysis Platform for Automatic Phenotyping and Trait Ranking of Plant Root Systems," *Plant Physiology*, 152:1148-1157 (2010).
Biskup et al., "Diel Growth Cycle of Isolated Leaf Discs Analyzed with a Novel, High Throughput Three-Dimensional Imaging Method Is Identical to That of Intact Leaves," *Plant Physiology*, 149:1452-1461 (2009).
Clark et al., "Three-Dimensional Root Phenotyping with a Novel Imaging and Software Platform," *Plant Physiology*, 156:455-465 (2011).
Shamir "A survey on mesh segmentation techniques," *Computer Graphics Forum*, 27:1539-1556 (2008).
Vieira et al., "Surface mesh segmentation and smooth surface extraction through region growing," *Computer Aided Geometric Design*, 22:771-792 (2005).
Attene et al., "Hierarchical mesh segmentation based on fitting primitives," Visual Computer, 22:181-193 (2006).
Mortara et al., "Plumber: a method for a multi-scale decomposition of 3D shapes into tubular primitives and bodies," *Proc Ninth ACM Symposium on Solid Modeling and Applications*, pp. 339-344 (2004).
Tierny et al., "Topology driven 3D mesh hierarchical segmentation," *Proc IEEE International Conference on Shape Modeling and Applications*, pp. 215-220 (2007).
Podolak et al., "A planar-reflective symmetry transform for 3D shapes," *ACM Transactions on Graphics*, pp. 549-559 (2006).
Tola et al., "Daisy: An Efficient Dense Descriptor Applied to Wide-Baseline Stereo," *IEEE Transactions on Pattern Analysis and Machine Intelligence*, 32:815-830 (2010).
Baumberg et al., "3D S.O.M.—A commercial software solution to 3D scanning," *Graphical Models*, 6th edition, 67:476-495 (2005).
European Search Report for EP Application No. 12855334A mailed Jul. 20, 2016.
Omasa et al. "3D lidar imaging for detecting and understanding plant response and canopy structure" J. of Exp. Botany, vol. 58, No. 4 (2007). pp. 881-898.
Biskup et al. A stereo imaging system for measure structural parameters of plan canopies. Plant, Cell and Environment (2007) pp. 1-10.
Tam et al. "Registration of 3D Point Cloudes and Meshes: A Survey from Rigid to Nonrigid" IEEE Transactions on Visualisations & Computer Graphics, vol. 19. No. 7. (2013) pp. 1199-1217.
European Search Report for European Patent Application No. 12 85 5334 (mailed Mar. 30, 2016).
Dai et al., "Tree Modeling through Range Image Segmentation and 3D Shape Analysis." *Adv. in Neural Network Research& Appli. LNEE.* 67:413-422 (2010).
Dornbusch et al., "A method to extract morphological traits of plant organs from 3D point clouds as a database for an architectural plant model." *Ecological Modelling* 200:119-129 (2007).
Livny et al., "Automatic Reconstruction of Tree Skeletal Structures from Point Clouds." *ACM Transactions on Graphics.* 29(6):151:1-151:8 (2010).
Paproki et al., "A novel mesch processing based technique for 3D plant analysis." *BMC Plan Biology.* 12(63):1-13 (2012).
Paproki et al., "Automated 3D Segmentation and Analysis of Cotton Plants." *International Conf. on Digital Image Computing: Techniques and Applications.* 555-560 (2011).
Paproki et al., "Automated Plant Phenomics 3D Analysis." *CSIRO Research Publications Repository.* (2011).
Quan et al., "Image-based Plant Modeling." *International Conf. on Comp. Graphics & Interactive Techniques. ACM.* 599-604. (2006).
Tan et al., "Image-based Tree Modeling." *ACM Trans on Graphics.* 26(3):87-1-87-7 (2007).
Xu et al., "Knowledge and Heuristic-Based Modeling of Laser-Scanned Trees." *ACM Trans. Graph.* 26(4):1-13 (2007).

\* cited by examiner

METHOD AND SYSTEM FOR CHARACTERIZING PLAN PHENOTYPE

This application is a U.S. National Stage Application under 35 U.S.C. §371 of International Patent Application No. PCT/AU2012/001476 filed 5 Dec. 2012, which claims the benefit of priority to Australia Patent Application No. 2011905053 filed 5 Dec. 2011, the disclosures of all of which are hereby incorporated by reference in their entireties. The International Application was published in English on 13 Jun. 2013 as WO 2013/082648.

TECHNICAL FIELD

The present invention relates to the field of plant phenomics, and in particular to a method and system for characterising the phenotype (including morphology and functional characteristics) of a plant.

BACKGROUND

In the coming decades, it is expected that mankind will have to double the production of food crops in order to meet global food demand. Research in plant phenomics, in particular in relation to deep plant phenotyping and reverse phenomics, assists in understanding the metabolism and physiological processes of plants, and helps to guide development of more efficient and resistant crops for tomorrow's agriculture.

Discovery of new traits to increase potential yield in crops relies on screening large germplasm collections for suitable characteristics. As noted in the study of Eberius and Lima-Guerra (*Bioinformatics* 2009, 259-278), high-throughput plant phenotyping requires acquisition and analysis of data for several thousand plants per day. Data acquisition may involve capture of high-resolution stereographic, multi-spectral and infra-red images of the plants with the aim of extracting phenotypic data such as main stem size and inclination, branch length and initiation angle, and leaf width, length, and area. Traditionally, these phenotypic data have been derived from manual measurements, requiring approximately 1 hour per plant depending on its size and complexity. Manual analysis of this type for large numbers of plants is impractical and the development of automated solutions is therefore called for.

Previous approaches to automation of phenotypic data extraction include the PHENOPSIS software of Granier et al (*New Phytologist* 2006, 169(3):623-635) and GROWSCREEN of Walter et al (*New Phytologist* 2007, 174(2):447-455). These are semi-automated approaches which employ 2D image processing to extract phenotypic data for leaves (leaf width, length, area, and perimeter) and roots (number of roots, root area, and growth rate).

Another approach is implemented in LAMINA of Bylesjö et al (*BMC Plant Biology* 2008, 8:82), another 2D image processing tool which is capable of extracting leaf shape and size for various plant species.

A further approach which works well for observation of root phenotypic traits such as number of roots, average root radius, root area, maximum horizontal root width, and root length distribution is implemented in RootTrace (Naeem et al, *Bioinformatics.* 2011, 27(9):1337; Iyer-Pascuzzi et al, *Plant Physiology* 2010, 152(3):1148) in which 2D image analysis is used to extract leaves and roots data.

Yet further approaches to automated phenotyping include the analysis of three-dimensional surface meshes constructed from stereographic images. For example, GROWSCREEN 3D (Biskup et al, *Plant Physiology* 2009, 149(3):1452) implements this approach for analysis of leaf discs, while RootReader3D (Clark et al, *Plant Physiology* 2011, 156(10):455-465) does likewise for roots. A three-dimensional approach allows more accurate automated measurements of leaf area, and the extraction of additional data such as root system volume, surface area, convex hull volume, or root initiation angles.

A disadvantage of each of the aforementioned approaches is that each is optimized for a particular plant organ or system such as leaves or roots, and does not provide a mechanism for studying the phenotype of the plant as a whole.

In addition, many plants have complex and irregular morphology. The present inventors have found that no generic mesh segmentation algorithm is robust enough to automatically and accurately identify the different plant parts (e.g. main stem, branches, leaves).

It would be desirable to alleviate or overcome one or more of the above difficulties, or at least to provide a useful alternative.

SUMMARY OF THE INVENTION

In accordance with one aspect of the invention, there is provided a computer-implemented method of characterising the phenotype of a plant, including:
  (i) obtaining mesh data representing a surface of the plant, said mesh data including data representing a plurality of polygons having respective sets of vertices, each vertex having a spatial coordinate; and
  (ii) applying at least two segmentations of progressively finer resolution to the mesh data to assign the vertices to distinct morphological regions of the plant.

The distinct morphological regions may include at least one primary region and one or more secondary regions. The primary region may be a main axis region. For example, the primary region may be a stem region.

The secondary regions may be composite regions, for example leaf-branch composite regions. A branch of a leaf-branch composite region is sometimes known as a petiole. A single petiole, or branch, may be associated with multiple leaves, depending on the plant species.

Step (ii) of the method may include:
  (iii) applying a first segmentation to the mesh data to generate first-pass segmentation data in which at least some vertices are assigned to the or each primary region; and
  (iv) applying at least one further segmentation to the first-pass segmentation data, whereby a segmented mesh is Obtained in which vertices remaining unassigned after step (iii) are assigned to one of the secondary regions.

The at least two segmentations may include applying a primitive shape-fitting to the primary region to define a boundary for the primary region. In embodiments, the boundary is substantially tubular. In embodiments, vertices lying outside the boundary are assigned to an uncategorised region. The method may include segmenting the primary region into parts. For example, if the primary region of the plant is a stem, the method may include segmenting the stem into internode regions. These may be separated by junctions, for example in the form of nodes. The junctions may be defined using vertices of the uncategorised region.

The at least one further segmentation may include applying a primitive shape-fitting to each composite region. For example, the primitive shape may be substantially tubular to define an initial boundary for a branch (petiole) sub-region of a leaf-branch composite region. In one embodiment, vertices of a leaf-branch composite region may be assigned to: the branch sub-region, if they lie within the initial boundary and within a predetermined distance of the primary region; or a leaf sub-region, otherwise.

If the plant includes one or more leaf sub-regions, the at least one further segmentation may include, for each leaf sub-region, applying at least one leaf segmentation to divide the leaf sub-region into two or more leaf sub-sections. The at least one leaf segmentation may include a sagittal leaf segmentation and a transverse leaf segmentation. The leaf segmentation may include estimating an axis of symmetry of the leaf sub-region. In embodiments, the method includes measuring the quality of the leaf segmentation.

In some embodiments, at least one of the secondary regions is generated during the first segmentation. Said at least one secondary region may be generated by region growing.

The method may include post-processing the segmented mesh to assign vertices of the uncategorised region to one of the secondary regions. In embodiments, the method may include post-processing the segmented mesh to assign isolated vertices to one of the secondary regions.

Typically, the mesh is reconstructed from morphological scans of the plant, for example by capturing a series of images in the visible part of the spectrum, at different angles, using standard imaging technology (e.g. one or more high resolution digital cameras). However, the mesh may also be reconstructed from other types of image data, such as multispectral images, and/or infrared images, including NIR (near infrared) and FIR (far infrared) images. In some embodiments, a first type of image data (preferably greyscale or RGB image data) is used to reconstruct the mesh, and one or more second types of data (e.g. spectral imaging and/or infrared imaging data) are mapped to the reconstructed mesh. Accordingly, the mesh data may include morphological scan data merged with other types of image data, which may be used to infer functional characteristics of particular parts of the plant.

In a second aspect, the invention provides a computer-implemented method of generating phenotype data for a plant, including:
generating segmented mesh data representing a surface of the plant, said segmented mesh data including data representing a plurality of polygons having respective sets of vertices, each vertex having a spatial coordinate and a label representing a distinct morphological region of the plant; and
using the spatial coordinates of the vertices, calculating one or more phenotypic parameters for at least one of the distinct morphological regions.

The phenotypic parameters may include one or more of leaf width, leaf area, stem length, stem inclination, branch initiation angle, or branch length.

In a third aspect, the invention provides a computer-implemented method of measuring time-variation of phenotypic parameters of a plant, including:
obtaining two or more segmented meshes, each segmented mesh including mesh data representing a surface of the plant at a given time point, said mesh data including data representing a plurality of polygons having respective sets of vertices, each vertex having a spatial coordinate and a label representing a distinct morphological region of the plant;
determining a time order for the segmented meshes according to time data associated with the segmented meshes;
aligning successive ones of the two or more meshes;
matching morphological regions of the plant at pairs of successive time points; and
calculating one or more phenotypic parameters for at least one of the morphological regions, thereby generating phenotype data for the one or more phenotypic parameters as a function of time.

Said aligning may include aligning centres of the successive ones of the two or more segmented meshes. Said aligning may include rotational alignment of the successive ones of the two or more segmented meshes. Said rotational alignment may include minimising a statistic which summarises distances between matched morphological regions.

In either the second or third aspects of the invention, the segmented mesh data may be generated by a method according to the first aspect of the invention.

In a fourth aspect, the invention provides a computer-readable storage medium having stored thereon processor-executable instructions that, when executed by a processor, cause the processor to execute the process of the first, second or third aspects of the invention.

In a further aspect, there is provided a computer system including at least one processor configured to execute the process of the first, second or third aspects of the invention.

BRIEF DESCRIPTION OF THE DRAWINGS

Certain embodiments of the present invention are hereafter described, by way of non-limiting example only, with reference to the accompanying drawings in which.

DETAILED DESCRIPTION

The embodiments and examples described below relate largely to phenotypic analysis of plants of the genus *Gossypium* (cotton plants), for example *G. hirsutum*. However, it will be understood that the invention may be more widely applicable, and may be used for phenotypic analysis of other types of plant. For example, the invention may be applicable to other dicotyledon plants, or to monocotyledon plants such as maize/corn (*Z. mays*) or grasses of the *Setaria* genus as will be described below.

In general, mesh segmentation algorithms involve partitioning the points (vertices) of the mesh into two or more sets (regions). A label (usually integer-valued) representative of the set to which a point/vertex belongs is assigned to each point/vertex. A review of mesh segmentation algorithms may be found in: Shamir, A., "A survey on mesh segmentation techniques", *Computer Graphics Forum* (2008) 27(6), 1539-1556, the contents of which are hereby incorporated by reference.

Due to the complex and irregular morphology of cotton plants, the inventors have found that no generic mesh segmentation method, singly applied, is robust enough to accurately identify the different plant limbs (i.e. main stem, branches, leaves). As a consequence, a hybrid segmentation process, combining different segmentation methods, was developed in order to efficiently partition the plant meshes, and to overcome the morphological shape differences from one plant to another and the various reconstruction issues due to occlusions.

Figure 1:
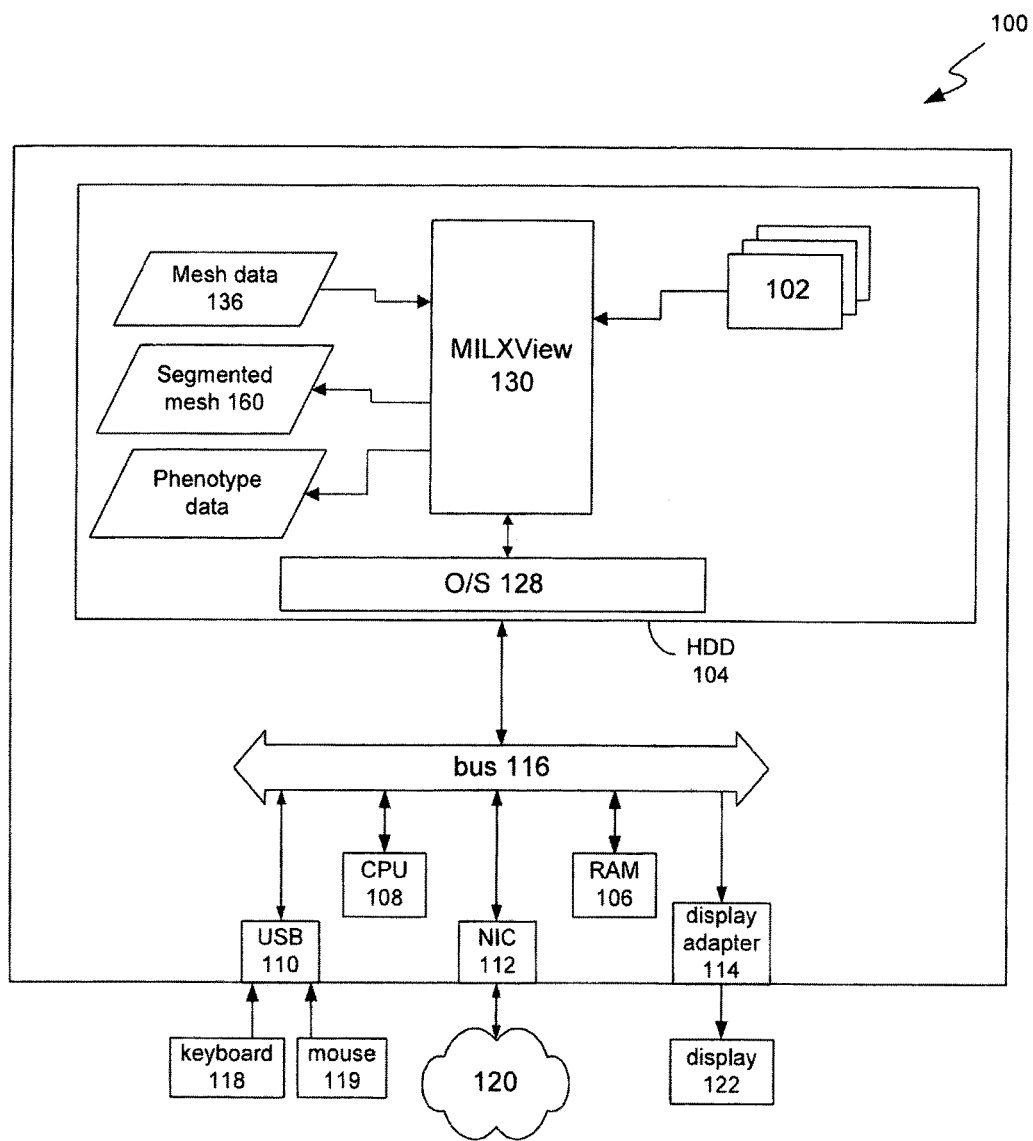
FIG. 1 is a schematic depiction of an exemplary plant phenotype characterisation system.

In the described embodiments, the segmentation process is implemented as one or more software modules executed by a standard personal computer system such as an Intel IA-32 based computer system, as shown in FIG. 1. However, it will be apparent to those skilled in the art that at least parts of the process could alternatively be implemented in part or entirely in the form of one or more dedicated hardware components, such as application-specific integrated circuits (ASICs) and/or field programmable gate arrays (FPGAs), for example.

Figure 2:
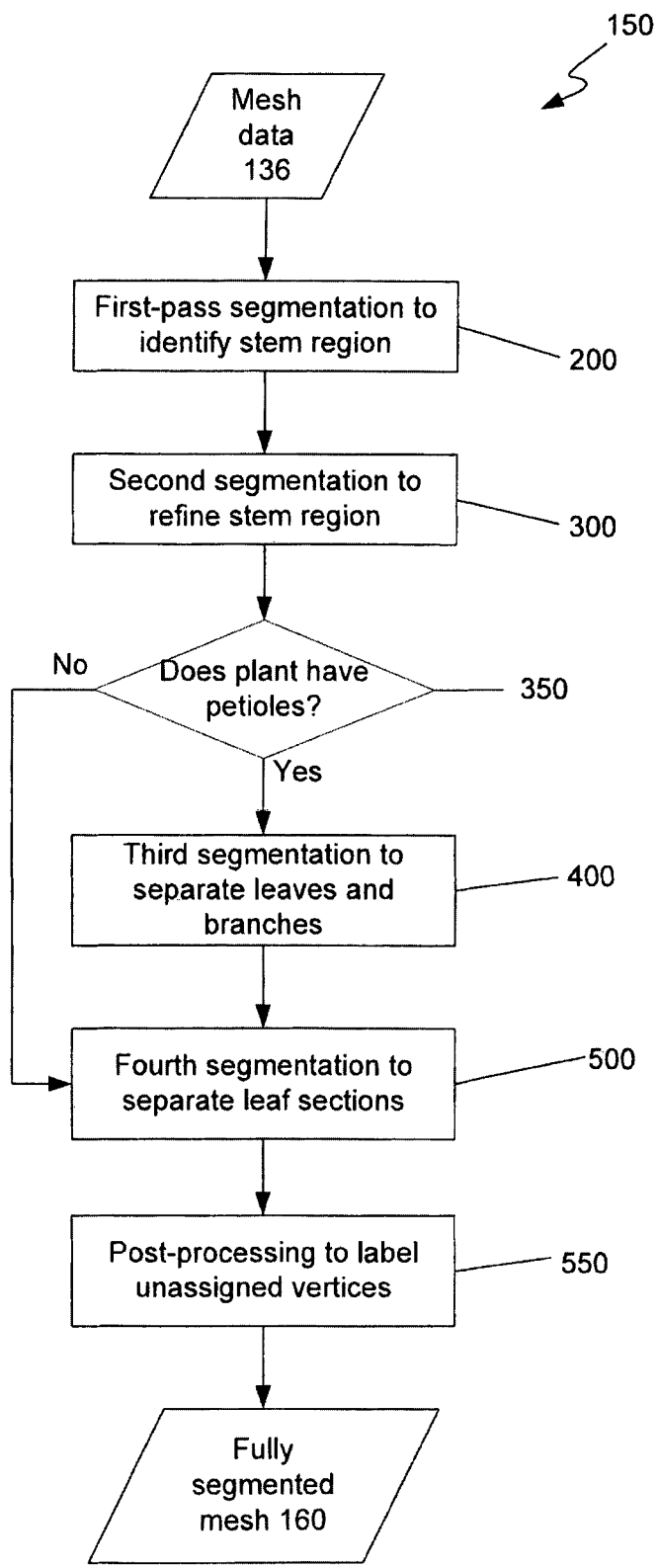
FIG. 2 is a flowchart of an example plant phenotype characterisation process.

As shown in FIG. 1, a plant phenotype characterisation system 100 executes a plant phenotype characterisation process, as shown in FIG. 2, which is implemented as one or more software modules 102 stored on non-volatile (e.g., hard disk or solid-state drive) storage 104 associated with a standard computer system. The system 100 includes standard computer components, including random access memory (RAM) 106, at least one processor 108, and external interfaces 110, 112, 114, 115, all interconnected by a bus 116. The external interfaces include universal serial bus (USB) interfaces 110, at least one of which is connected to a keyboard 118 and a pointing device such as a mouse 119, a network interface connector (NIC) 112 which can be used to connect the system 100 to a communications network such as the Internet 120, and a display adapter 114, which is connected to a display device such as an LCD panel display 122. The system 100 also includes a number of standard software modules, including an operating system 128 such as Linux or Microsoft Windows.

The system 100 may further include the MILXView software module 130 (CSIRO, available at http://research.ict.csiro.au/software/milxview/), and the software modules 102 may comprise one or more plugins configured to execute within the MILXView module 130, thereby to receive and process mesh data 136. Alternatively, the software modules 102 may comprise computer program code (for example, written in a language such as C++, Fortran 90, Java and the like, or an interpreted language such as Python) which is configured to receive and process the mesh data 136 independently of MILXView.

In one embodiment, described below, the plant phenotype characterisation process 150, illustrated in FIG. 2, includes three, optionally four, main steps:
1. a first-pass segmentation 200 to coarsely segment the main axis region, i.e. the stem of the cotton plant, from the remainder of the plant;
2. a second segmentation 300 to refine the stem region;
3. a third segmentation 400 to separate the branches (petioles) from the leaves, if the plant has petioles; and
4. a fourth segmentation 500, 530 to separate the sections of the leaves.

The exemplary process 150 of FIG. 2 therefore applies at least two segmentations of progressively finer resolution to the input mesh data to assign vertices of the mesh to distinct morphological regions of the plant, in this instance a primary region in the form of a stem region, and secondary regions in the form of leaf regions, branch (petiole) regions (where applicable) and sections of the leaves.

Process 150 may take as input an indication as to the type of plant, and in particular may receive plant type indicator data as to whether the plant is of a type which has petioles, or does not have petioles. The plant type indicator data may also represent the species/genus of plant (e.g. cotton, corn, *Setaria* etc.).

The process 150 may further include a post-processing step 550 to label any vertices which have remained unassigned following execution of the processes 200, 300, 400, 500. The result of the process 150 is a fully-segmented mesh 160 which can then be used as input to further plant phenotype analysis as will later be described.

Figure 7:
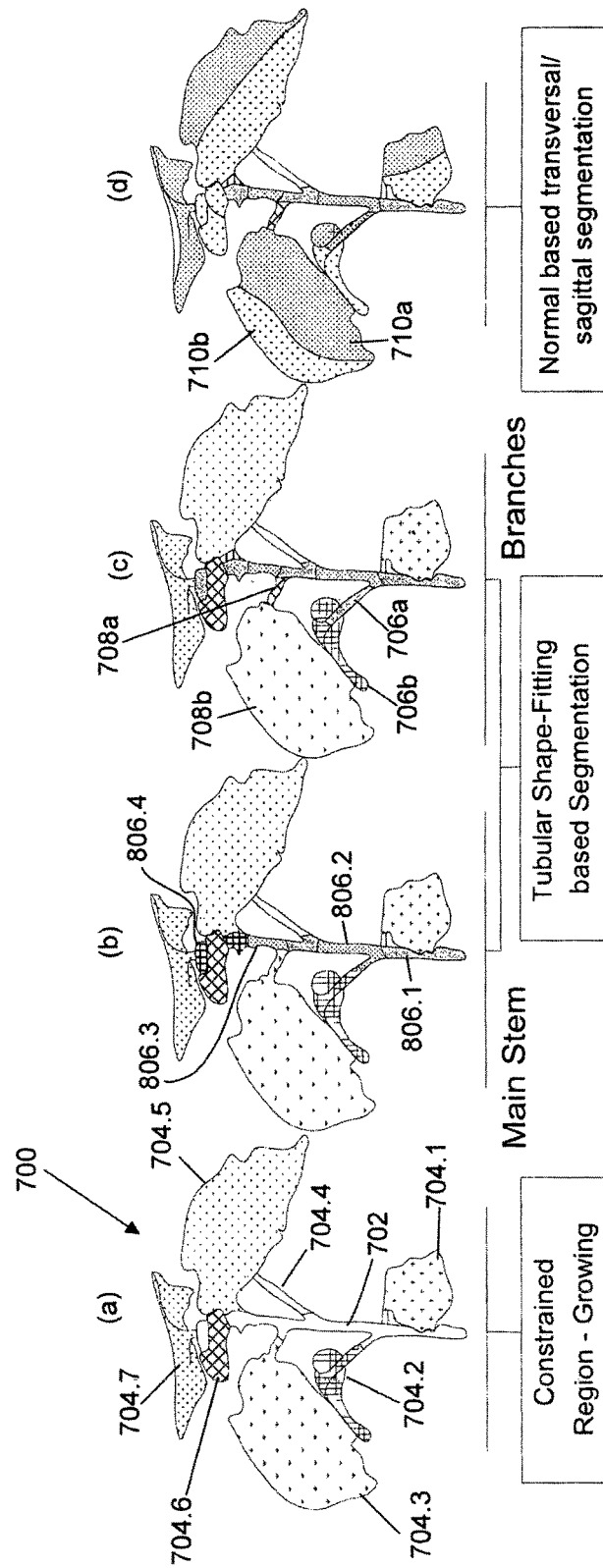
FIGS. 7($a$), ($b$), ($c$) and ($d$) schematically depict a plant at various stages during an embodiment of a plant phenotype characterisation process.

Exemplary results obtained at various stages during embodiments of the process 150 are illustrated in schematic form in FIGS. 7(a) to 7(d) for a cotton plant. In FIG. 7(a), the plant 700 has been segmented into a main axis region (stem) 702 and 7 leaf-branch regions numbered 704.1 through 704.7. The leaf of leaf-branch region 704.4 is obscured so that only the branch is visible. Next, in FIG.

Figure 8:
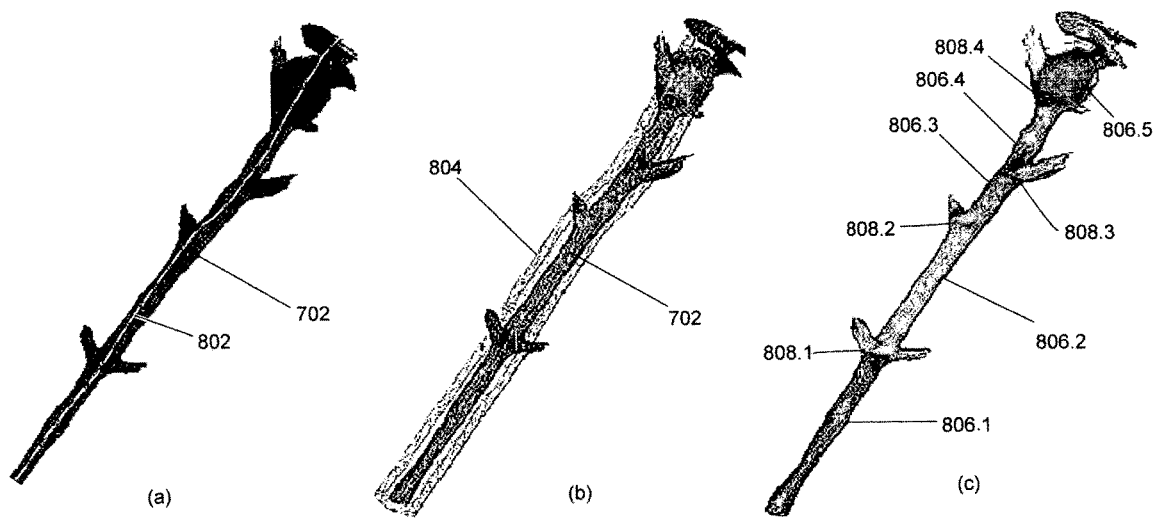
FIGS. 8($a$), ($b$) and ($c$) schematically depict a stem region segmentation process.

7(b), the stem has been segmented into stem regions 806.1 through 806.4 (see also FIG. 8(c)). In FIG. 7(c), the leaf-branch regions are segmented into branch regions 706a, 708a and leaf regions 706b, 708b (for example). In FIG. 7(d), the leaf regions are further segmented into leaf sub-sections (for example, 710a and 710b).

Figure 11:
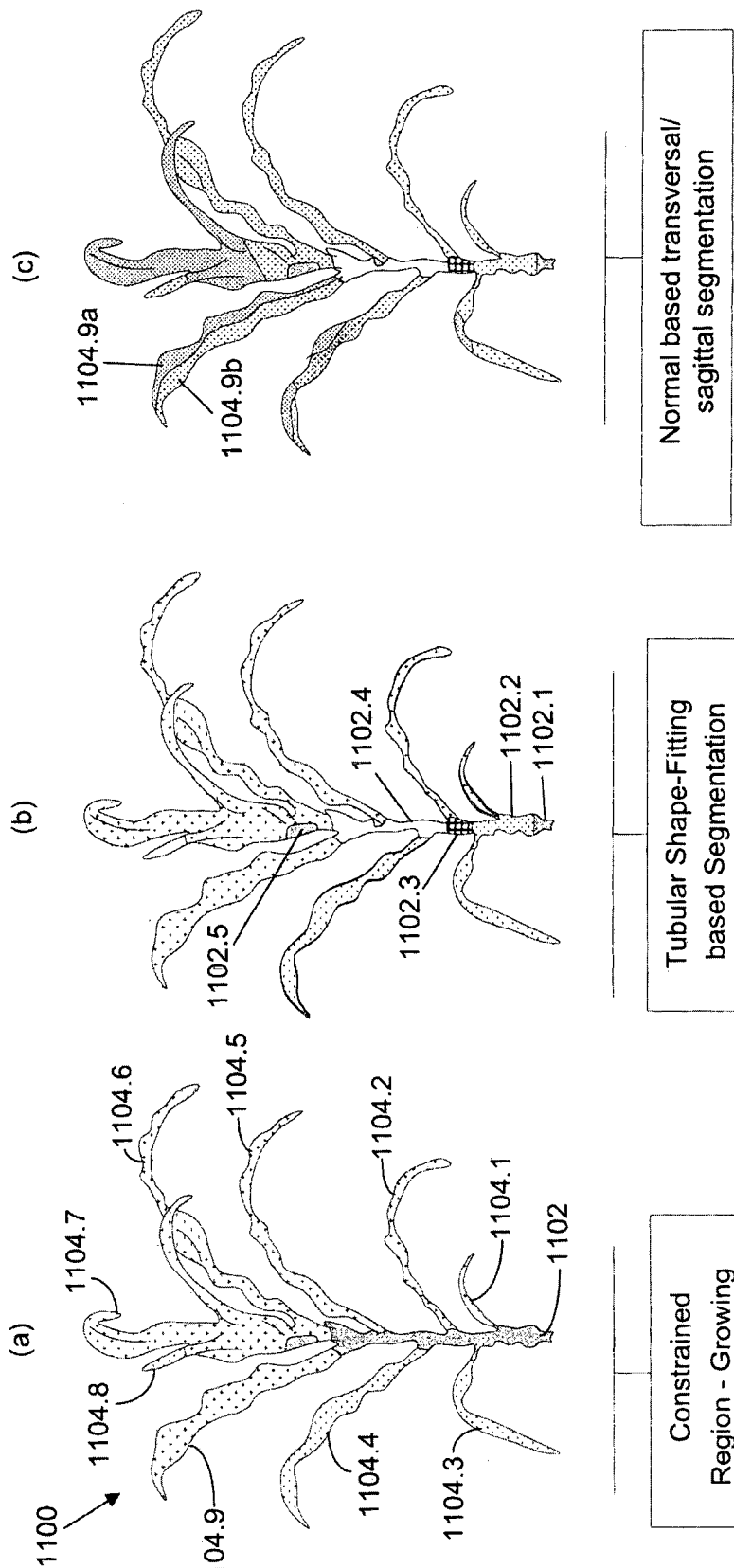
FIG. 11 shows, in highly schematic form, a sequence of segmentation results for a corn plant, in which 11($a$) shows the mesh after a coarse stem segmentation, 11($b$) shows the mesh after primitive shape fitting to more finely define the stem, and 11($c$) shows the mesh after leaf segmentation.

In another example, shown schematically in FIGS. 11(a) to 11(c), embodiments of the process 150 produce a segmented mesh for a corn plant 1100. In FIG. 11(a), the mesh is segmented into a main axis region 1102 and 9 secondary regions 1104.1 to 1104.9. In FIG. 11(b), the main axis region 1102 is further segmented into stem regions 1102.1 to 1102.5. Since corn leaves do not have branches (petioles), the process 150 then performs leaf segmentation to segment each leaf into sagittal (1104.9a and 1104.9b, for example) and transversal (not shown) sub-sections.

In the following discussion, spatial coordinates lie in Euclidean space, with the vertical axis being the z-axis. The following notation is used:
  $\omega = \{p_1, p_2, \ldots, p_m\}$ is the set of vertices of the mesh to be segmented, m being the total number of vertices;
  $d(p_1, p_2)$ is the planar Euclidean distance between vertices $p_1$ and $p_2$ on the x-y plane;
  $D(p_1, p_2)$ is the Euclidean distance (in three dimensions) between vertices $p_1$ and $p_2$.

The input data to the process 150 comprise mesh data 136 which are generated by any suitable mesh reconstruction method. For example, the mesh data 136 may be generated by passing a series of images of the plant, generated at varying viewing angles, to a 3D reconstruction program such as 3DSOM (see Example 1 below).

Step 200: Coarse Segmentation by Constrained Region-Growing

The purpose of first-pass segmentation 200 is to partition the mesh 136 into n+1 coarse regions (with n being the number of leaves). One partition is the partition for the main stem, and there are n further partitions, each partition containing a leaf-branch pair.

To perform this task a region-growing algorithm is used. Region-growing algorithms are described in, for example, Shamir (referenced above) and Vieira, M. and Shimada, K., "Surface mesh segmentation and smooth surface extraction through region growing", *Computer Aided Geometric Design* (2005), 22(8):771-792.

Region-growing algorithms that, starting from a seed point, topologically and gradually grow a region until given criteria are met, are particularly advantageous since the criteria to stop the growth of a region are user-defined.

Figure 3:
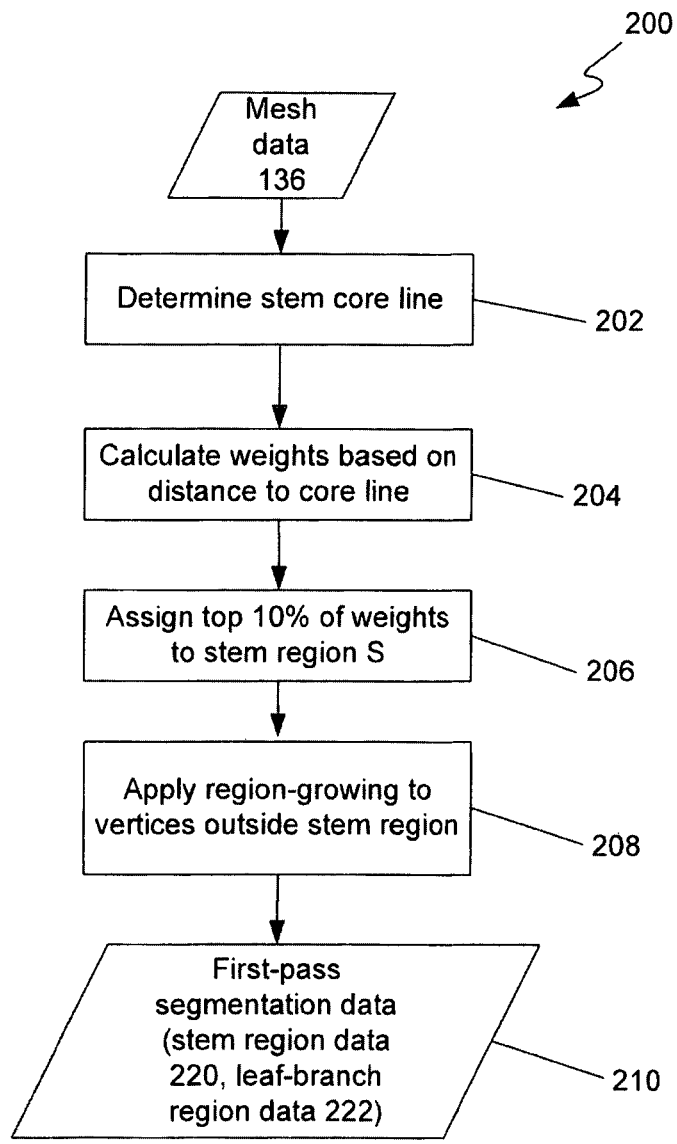
FIG. 3 is a flowchart of a first segmentation process which forms part of the method of FIG. 2.

Let c denote the plant centre and h the top of the mesh. In the first-pass segmentation process of FIG. 3, a core line for the main stem of the plant is determined, at block 202. Estimates of c and h are obtained by finding the lowest vertex for c and the highest vertex for h (i.e., the vertices having the lowest and highest z-coordinates). A straight line is then defined, constituted of n regularly spaced points ($l_1, l_2, \ldots, l_n$) which lie along the line from c to h.

Block 202 includes further steps of iterating over the points of the line which lie between c and h, i.e. the points ($l_2, \ldots, l_{n-1}$) and translating the coordinates of each point to map their rough position along the stem of the mesh. This is done by using the vertices $p_j$ belonging to their neighbourhood $V_u$ defined by Eq. (1) below:

$$V_u(l_i) = \{p_j | \Delta z(p_j, l_i) \leq C_1, d(p_j, l_i) \leq C_2\}, \quad (1)$$

with $C_1$ and $C_2$ being predetermined constants, $\Delta z(p_j, l_j)$ being the absolute height difference between $p_j$ and $l_i$ and d being the planar distance as discussed above. Values for $C_1$ and $C_2$ may be chosen on the basis of typical stem dimensions for the plant, suitably translated into mesh coordinates (if required) by methods known in the art. Alternatively, values for these constants may be derived from properties of the mesh. In alternative embodiments, the N nearest neighbours (with N chosen based on properties of the mesh, for example) can be used as the neighbourhood $V_i$ for each $l_i$.

The transformed coordinates of a given $l_i$ are calculated at block 202 as the average coordinates of the vertices of the corresponding neighbourhood $V_i$. The transformed $l_i$ then define a curve (core-line) $c_p$ along the stem.

In order to obtain an initial coarse main stem segmentation, a Gaussian weighting scheme is applied (block 204). For each vertex $v_k$ in the mesh, a weight $w_k$ is calculated according to Equation (1a):

$$w_k = \frac{1}{\sigma^2} \exp\left(-\left[\frac{D(v_k, l_{i,k})}{\sqrt{2}(D_m \sigma)}\right]^2\right), \quad (1a)$$

where $l_{i,k}$ is the point along the core line $c_p$ which is closest to, $v_k$, $D_m$ is the maximum of the $D(v_k, l_{i,k})$ over the mesh, and σ is a width parameter (e.g. 0.2) which can be chosen on the basis of training data and/or observations. It will be appreciated that any number of functional forms can be chosen for the weighting procedure, and that the Gaussian weighting scheme defined by Equation (1a) is just one such choice. Functions which decrease faster or more slowly than Equation (1a), as a function of $D(v_k, l_{i,k})$, may be chosen.

The set of vertices "S" defining the stem is then defined to be those vertices having weights in the highest 10% of the distribution of $w_k$ (block 206). The remaining 90% of vertices are assigned by region-growing (block 208), to generate n leaf-branch (or just leaf, if the plant does not have petioles) regions.

Starting from an arbitrary point that is not in the stem region S, called a seed, a new label is "grown" to all the eligible connected neighbours of the seed. That is, the (same) new label is applied to each eligible connected neighbour. A neighbour is eligible if it does not belong to any region yet.

The region-growing step 208 terminates when there are no neighbours remaining, i.e. all neighbours are already marked with a region label. Step 208 involves an iteration over the vertices of the mesh, with a new region being grown each time a non-labelled vertex is located—i.e., a vertex which is not part of any previously-identified region, and which can thus be a new seed.

The first segmentation 200 results in first-pass segmentation data 210, which include stem region data 220 and leaf-branch (or leaf) region data 222. A typical result of the first-pass segmentation is presented in the cotton plant example of FIG. 7(a), in which a plant 700 has been segmented into a stem region 702 and seven leaf-branch regions 704.1 to 704.7, i.e. n=7. Similarly, in the corn plant example of FIG. 11(a), plant 1100 has been segmented into a stem region 1102 and 9 leaf-branch regions 1104.1 to 1104.9, i.e. n=9.

In alternative embodiments, the stem region data 220 and leaf-branch region data 222 may be obtained as follows. Let $r_1$ and $r_2$ denote radii from the core-line $c_p$ such that $r_1$ is an inner radius, i.e. a radius within which a vertex p, is always part of the main stem region, and $r_2$ is an outer radius, i.e. a radius outside which a vertex is not part of the main stem region. The parameters $r_1$ and $r_2$ may be chosen based on training data from previously analysed plants. Alternatively, derivation of these parameters may be based on mesh properties.

The range of vertices belonging to the range [$r_1$, $r_2$] remains undetermined. To classify them, the normal n for each vertex of the mesh 136 is obtained by methods known in the art. For example, the normal at each vertex may be based on the triangulation of adjacent neighbouring points. More particularly, a normal vector may be determined for each polygon. A normal at a given vertex is then calculated by averaging the normals of the polygons which share that vertex. The angle $\alpha$ between $\vec{n}$ and the z-axis is also computed. In these alternative embodiments, a vertex $p_1$ is considered part of the stem region if a belongs to a pre-defined range.

The set of vertices "S" defining the stem is then given by the union of the set of vertices lying within the radius $r_1$, and the set of vertices lying between $r_1$ and $r_2$ and having a normal $\vec{n}$ with an angle $\alpha$ to the z-axis in the predefined range. Mathematically, this is expressed as follows:

$$R_1 = \{p_i \in \omega \mid d(p_i, c_p(p_i)) < r_1\} \tag{2}$$

$$R_2 = \left\{p_i \in \omega \mid r_1 \leq d(p_i, c_p(p_i)) \leq r_2, \left(\frac{\pi}{3} \leq \alpha \leq \frac{2\pi}{3}\right)\right\} \tag{3}$$

$$S = R_1 \cup R_2. \tag{4}$$

In Eqs. (2) and (3), $c_p(p_i)$ is the point on the curve $c_p$ having its z-coordinate closest to the z-coordinate of $p_i$. The angular range $\pi/3 \leq \alpha \leq 2\pi/3$ in Eq. (2) is typical for cotton plants and may also be applicable to other plants with similar morphology (especially, but not only, other dicotyledon plants). Alternatively, the angular range for a may be chosen based on the initial mesh properties.

Instead of the curve $c_p$ defined above, the plant centre c may instead be used in the above criteria (2) to (4). However, we have found that use of the curve $c_p$ provides superior results, particularly when the stem of the plant is inclined and/or has strong curvature.

Application of the criteria in Eqs. (2) to (4) above is performed to assign a label (for example, a numerical value) to each vertex satisfying the criteria. The remaining vertices of the mesh, i.e. the vertices not in set S, may be assigned by region growing as described with reference to block 208 in FIG. 3.

Step 300: Stem Segmentation by Primitive Shape Fitting

This step is based on a primitive fitting segmentation algorithm, inspired by those described in: Attene et al (2006) "Hierarchical segmentation based on fitting primitives", in *the Visual Computer*, Vol 22, pp 181-193; Mortara et al (2004) "Plumber: a method for multi-scale decomposition of 3D shapes into tubular primitives and bodies" in *Proc Ninth ACM Symposium on Solid Modeling and Applications*, pp 339-344; or Tierny et al (2007) "Topology driven 3D mesh hierarchical segmentation" in *Proc IEEE International Conference on Shape Modeling and Applications*, pp 215-220; the contents of each of which are hereby incorporated by reference.

Typically, primitive fitting segmentation includes finding a given shape (known a priori) in a complex mesh, and to define all the vertices lying within the boundary of the matched shape as belonging to the same region. This algorithm is particularly efficient on meshes having redundancy in the shapes that compose them, which is the case for branches of cotton plants, for example.

Figure 4:
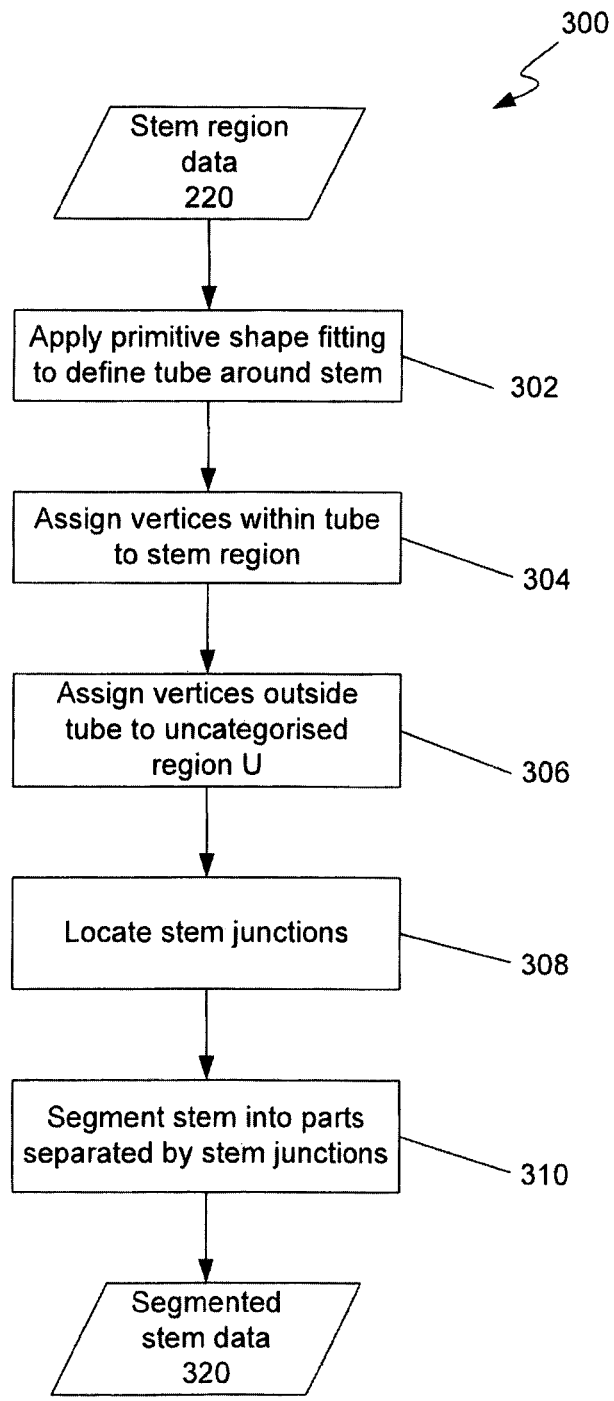
FIG. 4 is a flowchart of a stem region segmentation process.

Referring now to FIG. 4, the second segmentation process 300 takes the stem region S, represented by stem region data 220 output by first-pass segmentation 200, of Step 1 as its input. Since cotton plant main stems generally follow a tubular shape, the closest matching tube is built around the stem so as to narrow the previous coarse segmentation 200.

To create the tube shape, a curve that follows the stem is generated, and the tube then generated around the curve by primitive shape fitting, at step 302. The primitive shape fitting process initially defines h as the highest point of the stem region. A straight line is then defined, constituted of n regularly spaced points ($l_1$, $l_2$, . . . , $l_n$) which lie along the line from c (the plant centre, as previously defined) to h. The parameter n can be chosen based on the dimensions of the mesh. In general, larger n is also advantageous when the main stem has strong curvature. The inventors have found, for the mesh sizes and stem curvatures encountered in the studies described in the Example below, that an n of 60 is sufficient to provide good results.

Step 302 includes further sub-steps (not shown) of iterating over the points of the line which lie between c and h, i.e. the points ($l_2$, . . . , $l_{n-1}$), and translating the coordinates of each point to map their accurate position along the stem. This is done by using the vertices $p_j$ belonging to their neighbourhood $V_i$ defined by Eq. (5) below:

$$V_i(l_i) = \{p_j \in S \mid \Delta z(p_j, l_i) \leq C_1, d(p_j, l_i) \leq C_2\}, \tag{5}$$

with $C_1$ and $C_2$ being predetermined constants, $\Delta z(p_j, l_i)$ being the absolute height difference between $p_j$ and $l_i$ and d being the planar distance as discussed above. $C_1$ and $C_2$ may be chosen on the basis of training data and/or observations for previously studied plant meshes.

The transformed coordinates of a given $l_i$ are calculated during step 302 as the average coordinates of the vertices of the corresponding neighbourhood $V_i$. Note that the neighbourhood $V_i$ is different to that used in Eq. (1), since it is restricted to vertices in the stem region only, but the method is otherwise similar.

A tube is then created around the curve defined by the $l_i$ using a radius R which is parameterized according to the z-coordinate of the $l_i$.

At step 304, each vertex lying within the parameterized radius R is considered to form part of the tube and is definitively considered as part of the main stem region. A new region U (Uncategorized) is created at step 306 for the vertices that previously belonged to the coarse stem region S but which lie outside the tube. This, region U is made of vertices that should belong to branch regions B, with B, a region constituted of vertices topologically connected with each other without passing by the stem region. FIGS. 8(a) and 8(b) illustrate the curve and tube fitting along the stem. In FIG. 8(a), the curve 802 joining the points $l_i$ along the stem 702 is shown. FIG. 8(b) shows the fitted tube 804 encompassing the stem 702.

Once a sharply defined stem is obtained by the above shape fitting procedure, it can be segmented into further relevant parts. A stem part (internode), defined by Part$_i$, begins at a junction (node) $J_i$ between a branch $B_i$ and the stem, and extends to the next junction (node) $J_{i+1}$. The vertices from U are used to define the junctions at step 308. The z-coordinate of a given junction $J_i$ is defined as the z-coordinate of the lowest vertex belonging to corresponding branch region $B_i$ as defined above. Mathematically, the set of vertices $p_k$ belonging to Part$_i$ is defined by Eq. (6):

$$\text{Part}_i(J_i, J_{(i+1)}) = \{p_k \in S \mid J_{i,z} \leq p_{k,z} \leq J_{i+1,z}\} \tag{6}$$

where $J_{i,z}$ is the z-coordinate of junction $J_i$, and $p_{k,z}$ is the z-coordinate of vertex $p_k$.

The stem parts Part, are generally known in the art as internodes, with the junctions between the internodes generally being known as nodes.

After application of the criterion defined by Eq. (6) to the set S at step 310, a sharply segmented main stem is obtained, and the segmented stem data 320 are stored. An example is shown in FIG. 8(c). Stem parts 806.1 to 806.5 are separated by junctions 808.1, 808.2, 808.3, 808.4.

Following the refining of the stem segmentation at block 300, the process 150 determines, on the basis of the plant type indicator data, whether the plant has petioles. If so, it proceeds to branch-leaf segmentation at block 400. Otherwise, it skips to leaf segmentation at block 500.

Step 400: Branch Segmentation by Primitive Shape Fitting

The third segmentation step 400 of process 150 aims to separate all the regions containing a branch and a leaf, where applicable, into two distinct regions. The same processing is applied to each pair of branch and leaf. While the particular embodiment described here is directed to separating a single leaf from a single branch in a leaf-branch pair, it will be understood that the method may be easily extended to plants in which multiple leaves are associated with a single branch.

Figure 5:
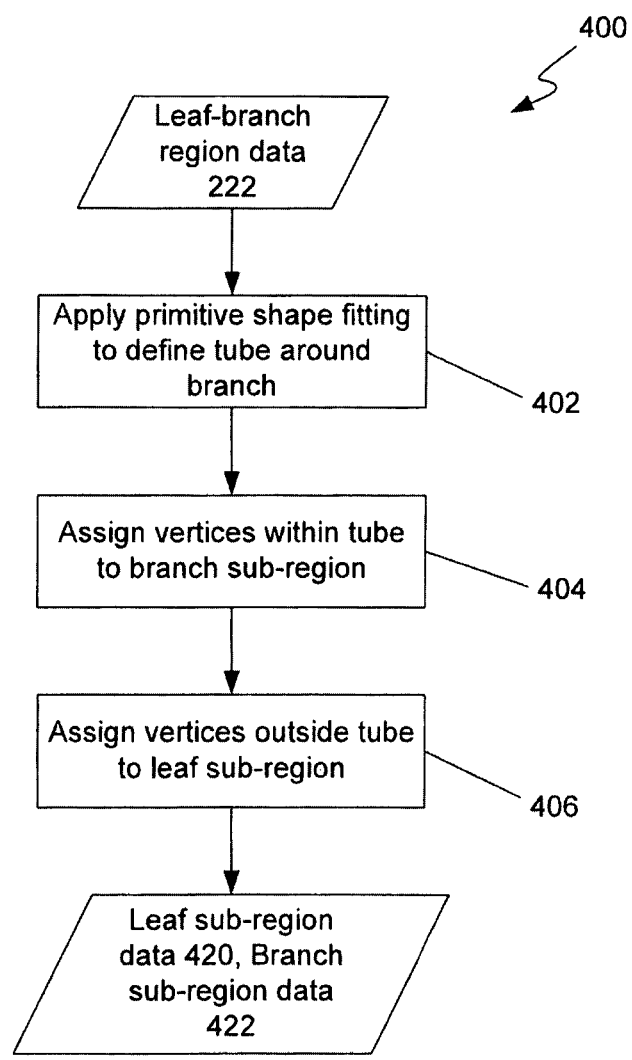
FIG. 5 is a flowchart of a leaf and branch segmentation process.

The third segmentation step 400, illustrated in FIG. 5, takes as its inputs the previously segmented leaf-branch pairs, i.e. the n non-stem partitions found in Step 1 and represented by leaf-branch region data 222. In a process similar to the one leading to the creation of the tubular shape bounding the stem, a primitive shape-fitting method is applied which, for a given leaf-branch pair, splits the pair into two different sub-regions: a branch (petiole) sub-region and a leaf sub-region.

Figure 9:
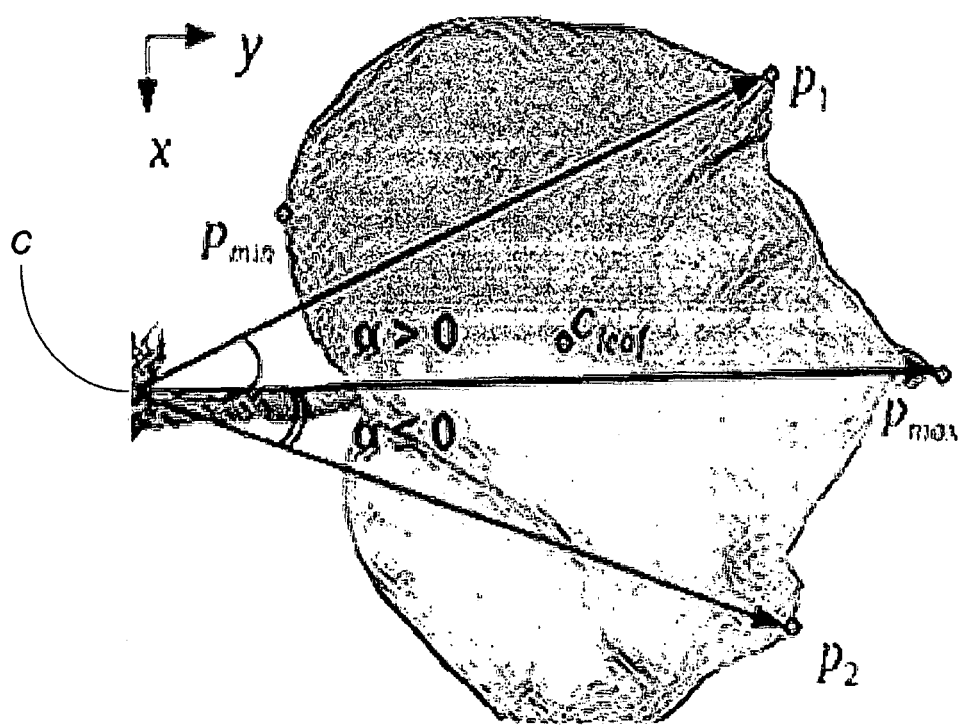
FIG. 9 schematically depicts a leaf sagittal segmentation process.

In step 402 of third segmentation process 400, the curve lying along a branch and leaf is initially defined as starting from the point c of the leaf-branch partition which is closest to the main stem, and finishing at the tip of the leaf. The leaf tip is defined by the point $p_{max}$ which maximizes the planar distance d from the core-line $c_p$, as illustrated in FIG. 9. A straight line is then defined, constituted of n regularly spaced points $(l_1, l_2, \ldots l_n)$ which lie along the line from, the point which is the closest to the core-line $c_p$, to $p_{max}$. Again, n may be chosen on the basis of training data and/or observations, or the dimensions of the mesh. In the studies of the Example, n was set to 45.

Each point $l_i$ (i=2, ..., n−1) of the curve is translated by first adjusting its height (z-coordinate) to the translated height of the previous point $l_{i-1}$. A neighbourhood $V_i$ of point $l_i$ is then determined according to:

$$V_i(l_i) = \{p_j \in \Gamma_k | D(p_j, l_i) \leq C\}, \quad (7)$$

where D is the standard 3D Euclidean distance as mentioned above, $\Gamma_k$ is the set of vertices for the $k^{th}$ leaf-branch pair (k=1, ... n), and C is a predetermined constant. C can be chosen on the basis of training data and/or observations.

The translated coordinates of $l_i$ are then calculated as the average of the coordinates of the vertices of the neighbourhood $V_i$.

Figure 10:
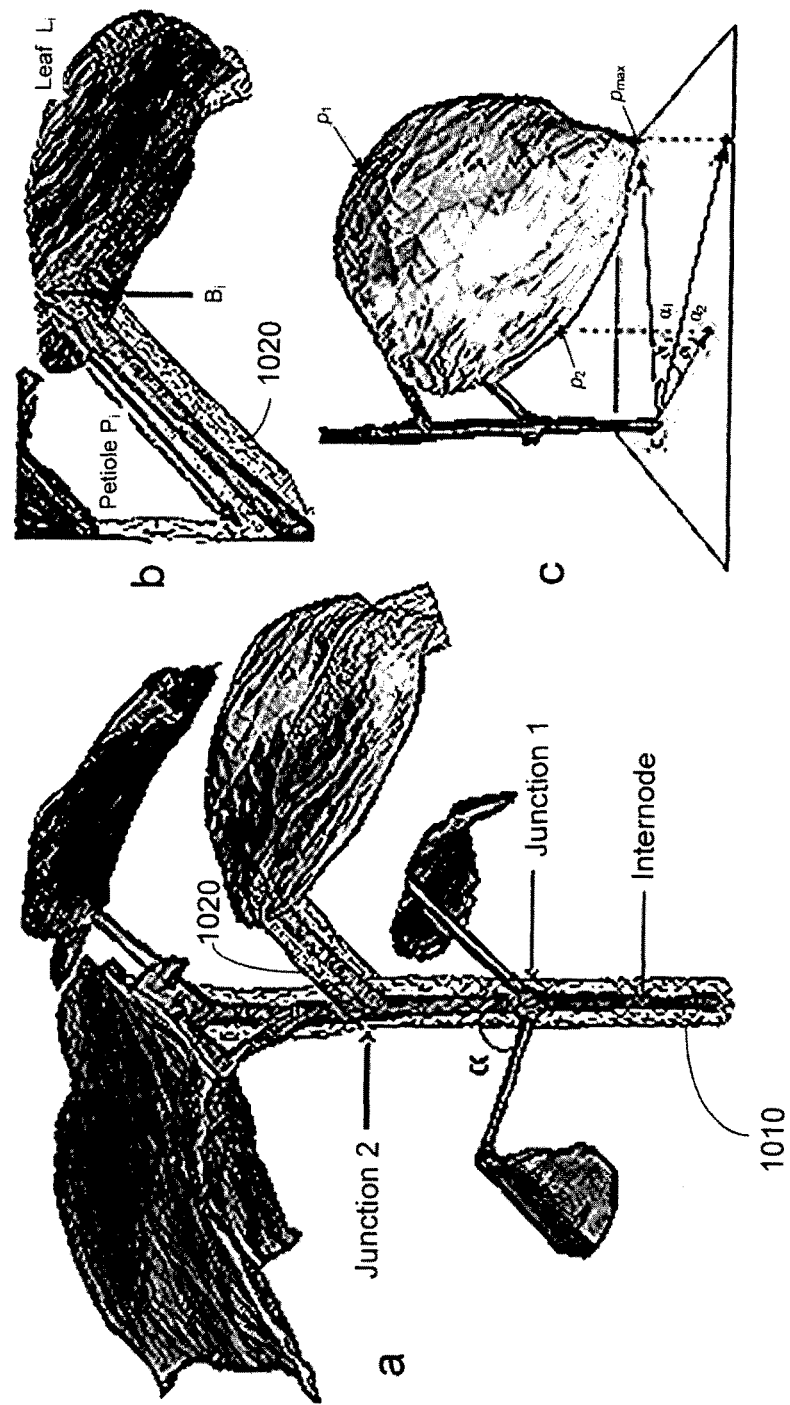
FIG. 10($a$) shows tubes used to segment a stem (1010) and one petiole (1020); 10($b$) illustrates the tube 1020 used to separate (segment) the petiole $P_i$ from the leaf $L_i$; 10($c$) illustrates planar symmetry used to segment a leaf into two symmetric sagittal parts (in this particular case, the points $p_1$ and $p_2$ will belong to two different leaf regions as the angles $\alpha_1$ and $\alpha_2$ have different signs)

The tube shape for the branch is generated in similar fashion as done during step 302 of the second segmentation 300. A predetermined parameterized radius around the curve defined by the $l_i$ is used to define the tube boundary, as shown in FIG. 10. The predetermined radius may be based on training data and/or observations.

Let $I_k$ and $O_k$ denote respectively the sets of vertices lying inside and outside the tube. We then define $p_{min}$ as the vertex from $O_k$ which is the closest to the core-line $c_p$ in terms of planar distance d (see FIG. 9). The sets of vertices defining the branch $B_k$ and the leaf $L_k$ are given by Eqs. (8) and (9):

$$B_k = \{p_j \in \Gamma_k | d(p_j, c) \leq d(p_{min}, c)\}; \quad (8)$$

$$L_k = \{p_j \in \Gamma_k | p_j \notin B_k\}. \quad (9)$$

Figure 12:
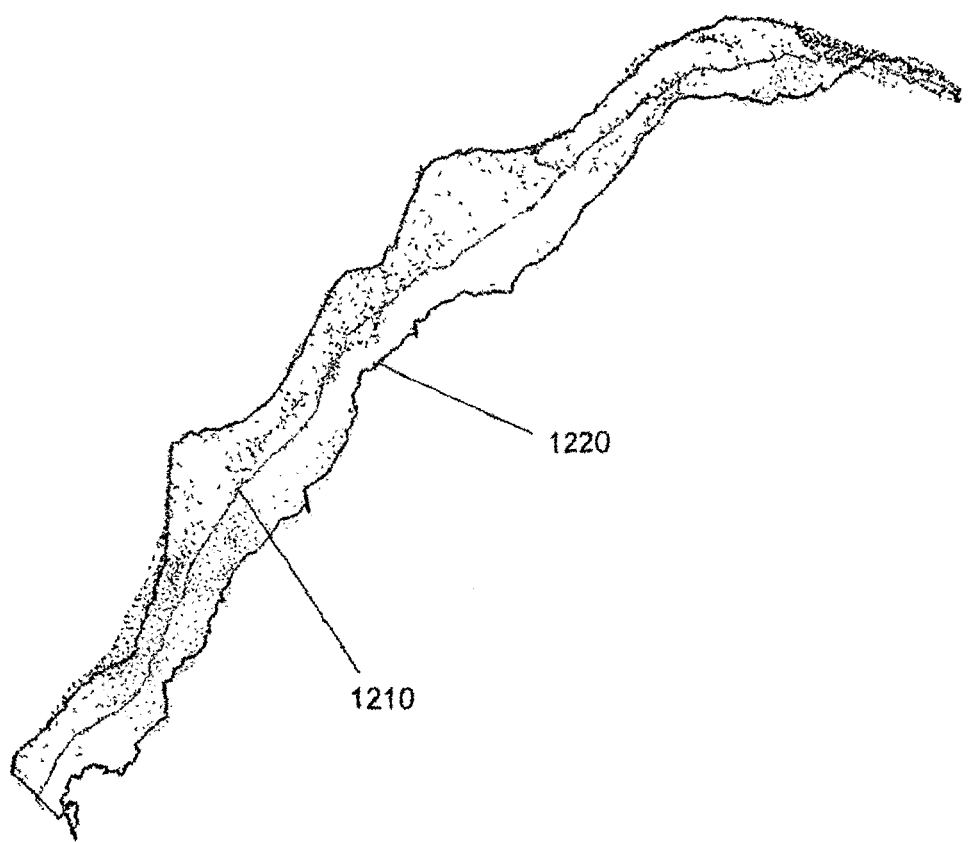
FIG. 12 illustrates results of a process used to estimate phenotypic parameters of a corn leaf.

These criteria are applied at steps 404 and 406 respectively in order to obtain leaf sub-region data 420 and branch sub-region data 422. FIG. 12 shows an example of the result of this segmentation step when applied to a particular leaf-branch pair.

Steps 500, 530: Leaf Segmentation

Figure 6A:
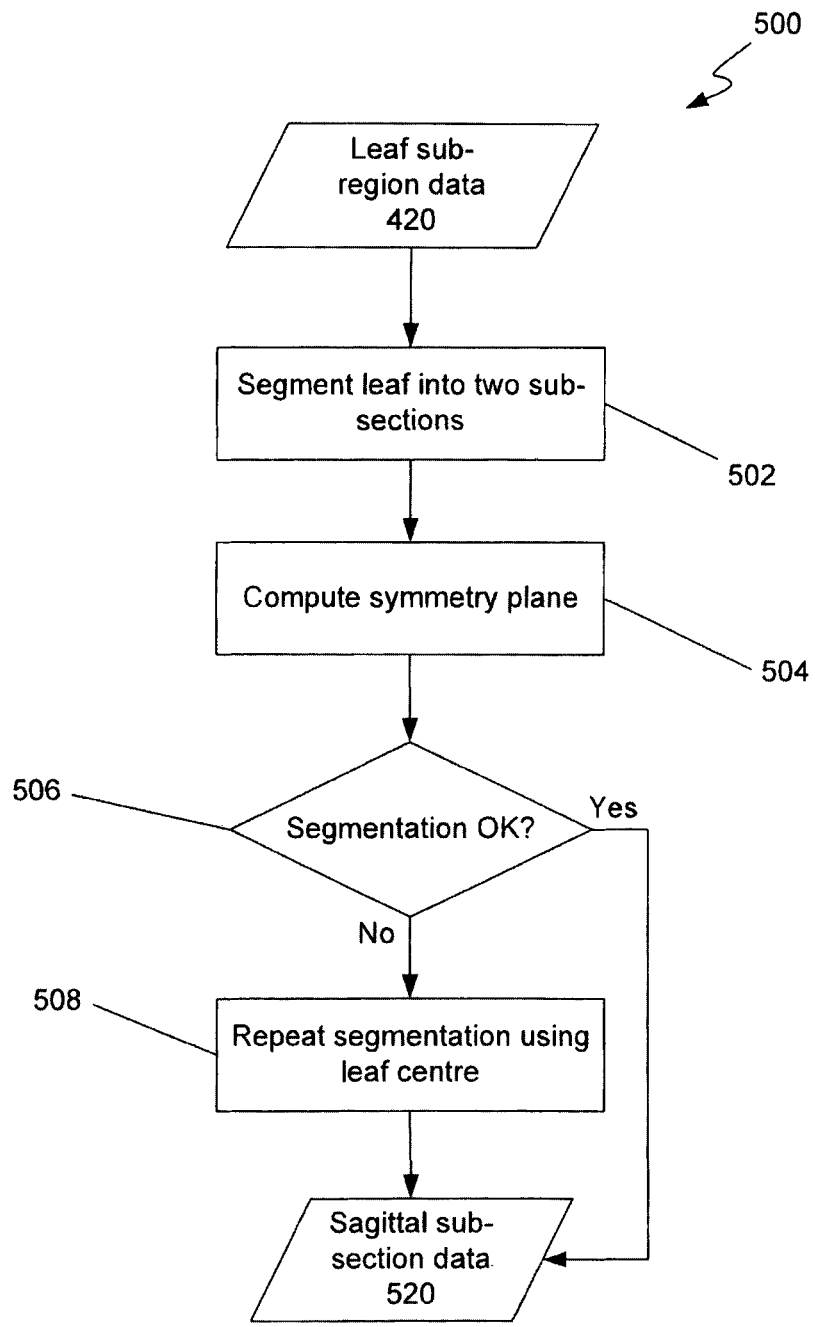
FIGS. 6A and 6B are flowcharts of leaf segmentation processes.
Figure 6B:
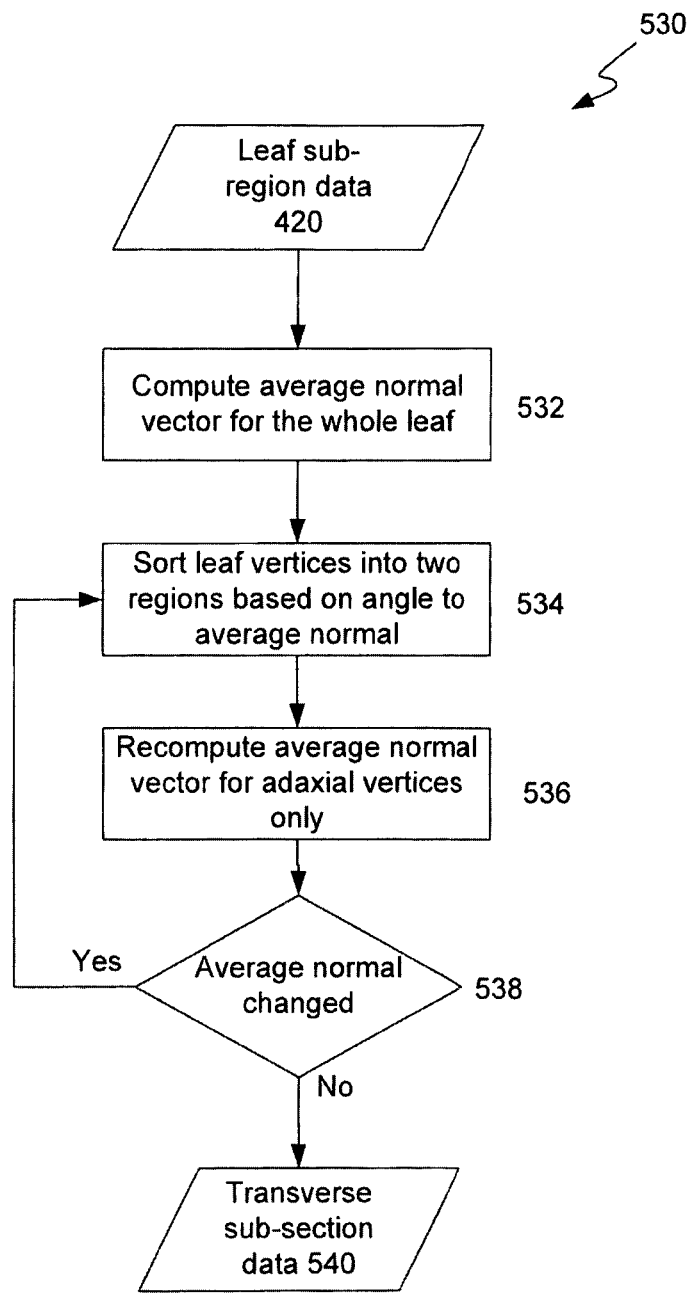

The leaf segmentation steps 500 and 530 illustrated in FIGS. 6A and 6B aim to obtain a sagittal (left and right parts) and transversal (adaxial and abaxial surfaces) segmentation of each leaf. The leaf segmentation is robust to natural leaf shape variation (as might be caused by folded leaves, or leaf shape changing over time for example) and poor leaf reconstructions due to occlusions during the mesh reconstruction process (as might occur due to abnormally high or low leaf thickness, or leaves being stuck together). This operation is highly advantageous for optimal estimation of leaf width, medial length, and area.

The approach described herein makes use of symmetries that are present in the majority of leaves. A number of methods may be applied to obtain the sagittal leaf segmentation, for example symmetry plane parameters optimization (see Podolak et al (2006) "A planar-reflective symmetry transform for 3D shapes", *ACM Transactions on Graphics* 25(3):549). However, it has been found that the 2D-symmetry based method described below produces more accurate sagittal segmentations. Advantageously, the method is also less computationally costly than alternative approaches.

Referring to FIG. 6A, the leaf sub-region data 420 output at step 400 are used as input to an initial sagittal leaf segmentation step 502. The series of steps 502, 504, 506, 508 is repeated for each leaf sub-region, i.e. for each identified leaf of the plant. For each leaf k, $p_{max}$ is defined as the point that is the furthest from the core-line $c_p$ as defined in the leaf-branch segmentation 400 (see FIG. 9). For a point $p_1$ of the leaf, $p_1 \in L_k$, the region of the leaf in which $p_1$ belongs can be determined by calculating two-dimensional position vectors (using the respective x- and y-coordinates) from the core-line $c_p$ to $p_{max}$, and the core-line $c_p$ to $p_1$, respectively, and then calculating the sign of the angle α between the position vectors. Each leaf k is thus segmented into two sub-sections (sets of vertices) $S_{1k}$ and $S_{2k}$ defined by:

$$S_{1k} = \{p_j \in L_k | \alpha \leq 0\}; S_{2k} = \{p_j \in L_k | \alpha > 0\}. \quad (10)$$

$S_{1k}$ and $S_{2k}$ are sets of vertices belonging to each side of the leaf k.

The quality of the sagittal segmentation can be evaluated as follows: first, the generated regions of the leaf are used in order to compute the symmetry plane π of the leaf at step 504. The plane parameters are defined such that $p_{max}$ is considered as the origin of the plane, and the normalized vector resulting from the cross-product between the z-axis and the vector going from the core-line to $p_{max}$ (with the z-coordinate set to 0, i.e. projection onto the (x,y) plane) is set as the plane normal. Coordinates of vertices from $S_{1k}$ and $S_{2k}$ are then retrieved, and for each side of the plane π, the maximum projection distances from the respective sets are calculated. These are denoted by $d_{S_{1k}}$ and $d_{S_{2k}}$. The segmentation is deemed satisfactory at step 506 if the following criterion is satisfied:

$$\rho = \frac{\max(d_{S_{1k}}, d_{S_{2k}})}{\min(d_{S_{1k}}, d_{S_{2k}})} \leq K, \qquad (11)$$

where K is a predefined number. K may again be chosen on the basis of training data and/or observations, and in the studies described in the Example, was set to 1.7.

If Eq. (11) is not satisfied, the sagittal segmentation process is repeated at step 508, but with the centre of the leaf, $c_{leaf}$, substituted for $p_{max}$ (see FIG. 9). $c_{leaf}$ is calculated as the centroid of the leaf, i.e. the average position of the vertices lying within the leaf. The solution that minimizes the absolute difference between $d_{S_{1k}}$ and $d_{S_{2k}}$, i.e. the one which minimizes p, is retained as the definition of the two sub-regions $S_{1k}$ and $S_{2k}$, and the sagittal sub-section data 520 are stored.

Referring now to FIG. 6B, a transverse leaf segmentation process carried out in respect of leaf $L_i$ begins at step 532 by computing an average normal vector $\vec{V}_{n_i}$ from the normal vectors of all vertices in leaf $L_i$. $\vec{V}_{n_i}$ will naturally point away from either the adaxial or abaxial surface of the leaf. Next, the vertices are assigned to putative adaxial and abaxial regions depending on the angle formed between their respective normal vectors and $\vec{V}_{n_i}$ (step 534). Vertices forming an absolute angle greater than $\pi/2$ are assigned to one region, and those forming an angle less than $\pi/2$ to the other region. For example, if $\vec{V}_{n_i}$ points away from the adaxial surface, then vertices with an angle of less than $\pi/2$ are assigned to the adaxial region, and vice versa.

Next, the average normal vector is recomputed (step 536), but this time using only vertices which have been assigned to the adaxial regions. At step 538, the transverse leaf segmentation process determines whether $\vec{V}_{n_i}$ has changed, and if so, returns to step 534 to re-assign the vertices to either the adaxial or abaxial surface using the new value for $\vec{V}_{n_i}$, and re-compute the average normal vector for the newly-assigned adaxial vertices. The process iterates until convergence is reached, with the result at convergence being transverse sub-section data 540 (i.e., the sets of adaxial and abaxial vertices).

Leaf segmentation processes 500, 530 described above are suitable for cotton plants and other plants with similar leaf morphology. Other plants, such as corn/maize, have different leaf morphology. Accordingly, some embodiments provide an alternative leaf segmentation process as follows.

Corn leaf segmentation is performed using a transversal segmentation process similar to that described above. Because corn leaves are sometimes highly curved, the normal vectors at the surface might vary widely between points near the plant stem and points near the leaf tip. Accordingly, when transversely segmenting corn leaves, a pre-processing step may be performed by dividing the leaf into two or more length-wise sections, preferably of roughly equal length. Dividing the leaf into sections can assist convergence of the segmentation by making each section more likely to be roughly linear.

The sagittal segmentation starts with the adaxial and abaxial regions generated by the transversal segmentation process. Perimeter points are located by locating vertices at the border of the adaxial and abaxial surfaces, e.g. by detecting vertices which lie on the adaxial surface but have an abaxial neighbour, and vice versa. The perimeter points are then classified into two different classes depending on their normal vectors. That is, perimeter points with normals having an (absolute) angle of less than $\pi/2$ between them point in the same direction and thus belong to the same class. Finally, vertices of the leaf are labelled (as being in the left or right sagittal sub-section) based on the classification of the closest perimeter point.

Step 550: Optional Post-Processing Step

In some embodiments, a post-processing step 550 may be performed to sharpen the segmentation and assign any vertices that might have escaped the above segmentation steps. For instance, as a first pass, any vertices belonging to the undefined region U are assigned. The shared property of those vertices is that they belong to a branch; hence, they have to be added to the appropriate branch region.

To perform this first pass, an adaptive region-growing method can be used. The seeds for the region-growing are the vertices from U that share an edge with a vertex from a branch region $B_k$. For each seed, the branch label k is then progressively and recursively assigned to each topological neighbour which is in the region U.

In a second post-processing pass, isolated vertices are assigned to a region from their neighbourhood. A vertex is considered isolated when none of its topological neighbours belongs to the same region as the vertex under consideration.

Following Steps 1 to 4 and optionally, Step 5 above, the mesh is fully segmented. The fully segmented mesh data 160 (FIG. 2) can be used to extract quantitative phenotypic data.

Plant Data Extraction

For plant phenomics studies, the plant data of interest include (without limitation) the main stem size, branch initiation angle and length, and leaf width, length, area and inclination. The following discussion explains how, using the segmented plant meshes, these data can be generated.

Once the different morphological parts of the plant are identifiable (for example, as a result of segmentation processes 200, 300, 400, 500, 530) from the segmented mesh 160, phenotypic plant data can be calculated, for example for each plant limb.

Main Stem Height/Length

To compute the main stem height, the highest and the lowest vertices (highest and lowest z-coordinate, respectively) in the stem regions are located, and the absolute height difference between them is calculated. Alternatively, the Euclidean distance between the highest and lowest vertices may be calculated as representative of stem height. To obtain the stem length, the length of the curve $c_p$ defining the main stem core line (see above) can be used.

The normalised position vector between the highest and lowest vertices may be used to define the main stem axis. The inclination angle of the main stem is then calculated by computing the angle between the main stem axis and the z-axis.

Branch (Petiole) Data

If the plant is of a type which includes petioles (for example, cotton and the like), and $c_i$ is a curve interpolated along a petiole $P_i$ (for example, as generated during the branch segmentation process 400 above), the length of the petiole can be calculated as the length of the curve $c_i$. In addition, if $l_i$ denotes the point along $c_i$ that is the closest to core line $c_p$ of the main stem and $h_i$ denotes the highest point on $c_i$, then the angle $\alpha$ between the main stem axis and the vector $\vec{l}_i - \vec{h}_i$, defines the petiole initiation angle (see FIG. 10a).

Leaf Data

The leaf width and length for each segmented leaf $L_i$ are computed, depending on the type of plant, as follows.

Cotton and Similar Plants

A centroid $Lc_i$ of the leaf is calculated from all vertices belonging to the leaf. Next, position vectors between $Lc_i$ and vertices belonging to the right sagittal sub-section (as obtained by the sagittal segmentation 500, for example) are calculated and averaged to obtain a vector $\vec{u}_{i,1}$. A vector $\vec{u}_{i,2}$ from $Lc_i$ to the tip of the leaf is also calculated. The leaf sagittal plane can then be defined as $\Pi_{i,1} \equiv (Lc_i, \vec{u}_{i,1})$ where $Lc_i$ is the plane origin and $\vec{u}_{i,1}$ the plane normal. The leaf coronal plane can be defined as $\Pi_{i,2} \equiv (Lc_i, \vec{u}_{i,2})$. The sagittal and coronal planes are illustrated in the example shown in FIG. 13*a*.

Figure 13:
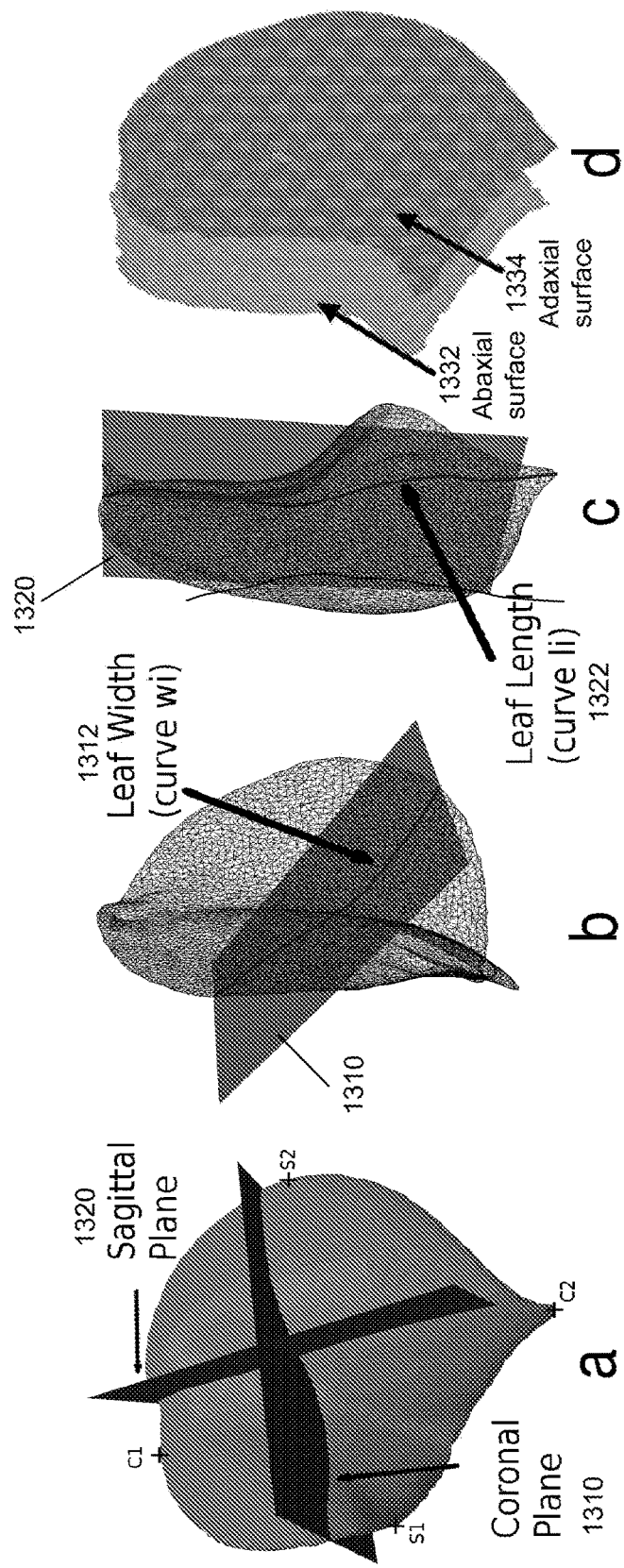
FIG. 13(a) shows leaf sagittal and coronal planes, and points S1, S2, C1, C2 which are used to compute the leaf width and length; 13(b) shows the projection 1312 (onto the coronal plane 1320) of the line fitted to the shape of the leaf from S1 to S2—the projected line length is the estimate of the leaf width; 13(c) shows the projection 1322 (onto the sagittal plane 1320) of the line fitted to the shape of the leaf from C1 to C2—the projected line length is the estimate of the leaf length; 13(d) represents a leaf transversally sliced into abaxial 1332 and adaxial 1334 surfaces (using a normal vector clustering algorithm)

Next, the points $S_{i,1}$ and $S_{i,1}$ which lie either side of $\Pi_{i,1}$ and which lie the maximum distance from are located. Similarly, points $C_{i,1}$ and $C_{i,2}$ which lie either side of $\Pi_{i,2}$ and which lie the maximum distance from $\Pi_{i,2}$ are located (FIG. 13*a*).

To estimate leaf width, a curve w, is interpolated to the leaf shape from $S_{i,1}$ to $S_{i,2}$ and then projected onto $\Pi_{i,2}$ (to remove additional transversal length). The leaf width is then estimated as the length of the projected curve $w_i$. The interpolation can be done, for example, by selecting n points (e.g. n=45) along the line from $S_{i,1}$ to $S_{i,2}$, and then for each point along the line, locating the N nearest neighbour vertices (with N depending on the number of vertices of the mesh, for example). The positions of the N nearest neighbours are then averaged to obtain an interpolated position on the line.

Similarly, to estimate leaf length, a curve $l_i$ is interpolated to the leaf shape from $C_{i,1}$ to $C_{i,2}$ and then projected onto $\Pi_{i,1}$, with the length of the projected curve $l_i$ then being used to estimate leaf length. The leaf width/length estimation are depicted in FIGS. 13*b* and 13*c* for cotton.

The projection of the vector from $C_{i,1}$ to $C_{i,2}$ onto $\Pi_{i,1}$ is used to compute the leaf axis. The angle between the leaf axis and the main stem axis is then computed to provide the leaf inclination.

The leaf area can be estimated by averaging the areas of the adaxial and abaxial surfaces (generated by the transversal segmentation process 530). Each of those areas can be computed by summing the areas of the polygons which compose them.

The leaf thickness can be estimated by averaging the respective distances from each vertex of the adaxial surface to the closest vertex on the abaxial surface.

Alternative embodiments provide the following method of calculating leaf width and length. To calculate the width of a leaf, the previously computed symmetry plane, also known as the cut plane, is used. For each side of the cut plane, the point which is furthest (by Euclidean distance) from the plane is located. The projection distances of the two respective points onto the cut plane are calculated, and summed to provide an estimate of leaf width. To compute the leaf length, the vertices that intersect, or are nearest, to the cut plane are located. Of these, the two vertices which are separated by the greatest distance are then located, and the Euclidean distance between these two vertices is computed to provide an estimate of leaf length. Further, the normalised position vector between these two points can be computed to define a leaf axis. The angle between this leaf axis and the main stem axis gives the leaf inclination. To compute the (planar) leaf area, the polygons composing one face of the leaf (top or bottom) are projected onto the plane which is the most coplanar with the leaf, and the area of the projected polygons is summed.

Corn, *Setaria* and Similar Plants

Leaf width and length estimation for corn/*setaria* and the like commences by defining a curve from the base to the apex of the leaf, in similar fashion to the definition of the curve (core line) $c_p$ defined for the petiole segmentation at block 400. A series of points $l_i$ is chosen at regular intervals between the base (lowest z coordinate) and apex (vertex having the largest distance from the base). Then the nearest neighbours to $l_i$ (either based on the absolute number of neighbours, or all vertices lying within a certain distance of $l_i$ as before) are chosen and used to calculate a translated coordinate $l_i'$ which is the average of the vertices in the selected neighbourhood. The $l_i'$ define the curve 1210 (FIG. 12) from the base to the apex, and the length of that curve is used to estimate the length of the leaf.

The perimeter 1220 (FIG. 12) of the leaf can be estimated by taking the perimeter vertices obtained from the leaf segmentation, and fitting a line to the perimeter vertices. The line fitting is performed by selecting a point of the perimeter as an initial point and incrementally adding the nearest neighbor to the line until returning to the initial point.

To estimate the leaf width, at each point $l_i'$ (alternatively, a subset of the $l_i'$) the closest perimeter vertices (based on Euclidean distance) on each side of the leaf are obtained. The length of the line joining the perimeter points and $l_i'$ is used to estimate the width $W_i$ of the leaf at $l_i'$. The $W_i$ are then averaged to provide an estimate of the overall width of the leaf.

Leaf area can be estimated in a similar manner to the area estimation performed for cotton.

Longitudinal Analysis

One type of analysis which is of interest in plant phenomics is longitudinal analysis, i.e. monitoring the variation of the computed plant data over time. This is a relatively straightforward process for monitoring of the stem height, as calculated above. However, longitudinal analysis of leaf data requires an efficient matching algorithm that tracks the different plant parts over time.

Assuming that a plant part position does not vary much for two close dates, a "pairwise matching" method for each pair of successive time points can be applied in order to obtain the sequences of leaves, and, consequently, branches. This pairwise method may be divided into two main steps: an alignment of the two plants and a parts matching step.

Plant Alignment

In order to align a pair of plants, a translation is performed such that the centres of the two plants coincide. One of the plants is then incrementally rotated about its main stem axis. For each angle of rotation a, the following metric is calculated:

$$m_\alpha(T_x, T_{x+1}) = \sum_{i=1}^{i \leq \Psi_{T_x}} D_c(Lc(T_x, i)); \quad (12)$$

$$D_c(Lc(T_x, i)) = \min_{1 \leq j \leq \Psi_{T_{x+1}}} (D(Lc_{T_x,i}, Lc_{T_{x+1},j})). \quad (13)$$

In Eqs. (12) and (13), $Lc_{T_x,i}$ is the centroid of leaf i at time point $T_x$ and $\Psi_{T_x}$ is the number of leaves of the plant at time point $T_x$. $D(Lc_{T_x,i}, Lc_{T_{x+1},j})$ is the Euclidean distance between centroids $Lc_{T_x,i}$ of plant i at time $T_x$ and $Lc_{T_{x+1},j}$ of plant j at time $T_{x+1}$. The angle α which minimizes the metric $m_\alpha$ of Eq. (12) is the relative angle of rotation between the two plants for an optimal alignment.

Plant Parts Matching

Stem Parts Matching:

This step aims to match the different stem parts together. First of all, it is important to remark that branches may grow between two time points, and thus, create additional nodes and therefore additional internodes, i.e. stem parts. A stem part of the plant at time $T_x$ may accordingly be split into two parts at time $T_{x+1}$, meaning that a stem part from the plant at time-point $T_x$ can be matched with 2 or more stem parts from the plant at $T_{x+1}$.

Figure 14:
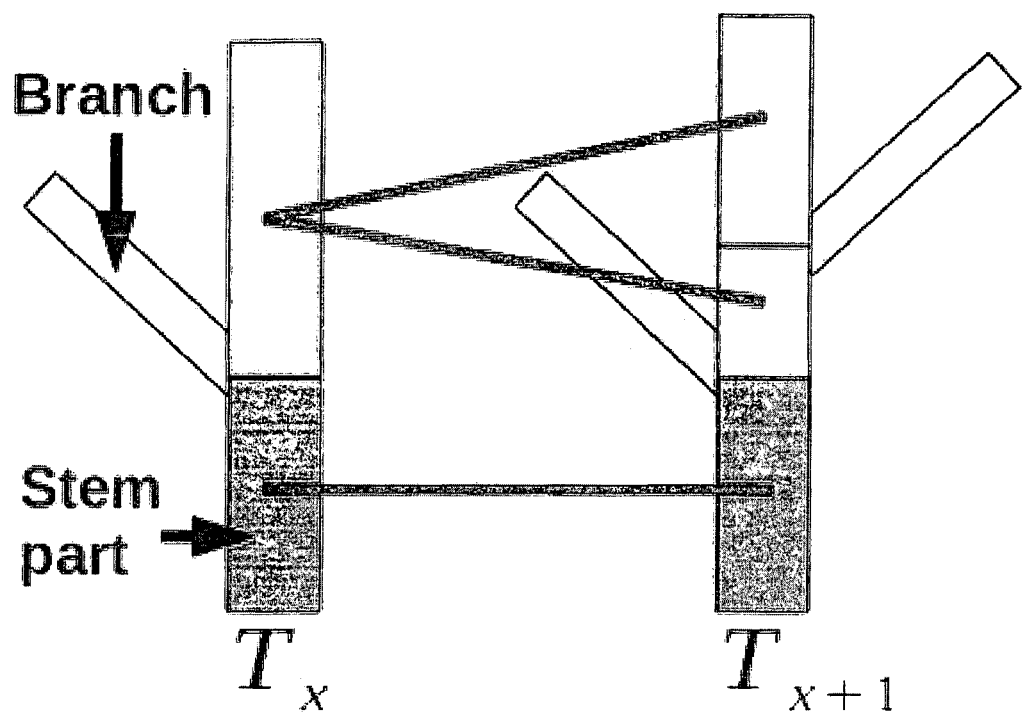
FIG. 14 schematically illustrates matching of stem parts between two plants as part of a plant phenotype analysis.

For each of the two plants, the stem parts are ordered by increasing height, and the lowest and highest boundaries (vertices) of each stem part are located. Two parts are matched when there is an overlap between their boundaries. This is illustrated schematically in FIG. 14.

Leaves and Branches Matching:

In this step, the plant alignments generated previously are used.

The different leaves (and therefore branches) of a pair of aligned plants is matched by solving an assignment problem. An adjacency matrix having $\Psi_{T_x}$ rows and $T_{x+1}$ columns is generated. At position (i, j) in the matrix, the distance $D(Lc_{T_x,i}, Lc_{T_{x+1},j})$ between the centroid of the leaf i of the plant at $T_x$ and of the centroid of the leaf j of the plant at $T_{x+1}$ is stored.

Since the plants are aligned, two leaves are defined as eligible for pair-wise correspondence only if their centroids (computed as the respective average positions of vertices lying within the respective leaves) lie, within a given angular range of each other, the angular range being determined via training data and/or observations. For example, the maximum angle between the centroids may be set to 60 degrees. If the centroids do not lie within a given angle of each other, their centroid distance in the adjacency matrix is set to infinity, or to a large number, for example the largest positive number representable as a single or double precision number by a processor executing the steps of the method.

The adjacency matrix is used as input to an assignment method, for example a method implementing the Hungarian algorithm or another known assignment algorithm, in order to minimize the sum of the distances between the paired leaves. Likewise, the branches linked to the paired leaves will be paired as well.

Mapping Other Types of Imaging Data to the Mesh

Some embodiments may include acquiring spectral imaging data (e.g., multispectral or hyperspectral data spanning wavelengths in the visible and infra-red range) and/or infrared imaging data for the plant, in addition to the visible-light 3D scans used to reconstruct the plant mesh. These data can be used to generate a texture which can be mapped to the mesh, such that following mesh segmentation, the spectral imaging data and/or infrared imaging data can be associated with particular parts of the plant. Accordingly, the imaging data acquired for a given plant part (leaf, stem etc.) at a given time or under a given set of conditions can be directly compared with imaging data at another time or under a different set of conditions. This allows meaningful inferences to be made regarding plant responses to changes in environmental conditions or responses to specific stresses (Nitrogen, Phosphorus, salt, etc.).

For example, an infrared sensor and an RGB sensor (the images from which are used to reconstruct the mesh) can be placed at fixed positions and used to capture a series of images as the plant is rotated through 360 degrees. Preferably, the IR sensor is placed very close (a few centimeters distance) to the RGB sensor, such that an affine transformation matrix can be used to register the IR information to the RGB information. The affine transformation matrix can be calculated using a feature-matching algorithm such as DAISY (see Tola, E., Lepetit, V. and Fua, P. (2010) DAISY: An efficient dense descriptor applied to wide baseline stereo, *IEEE Trans. on Pattern Analysis and Machine Intelligence* 32(5), pp 815-830, the entire contents of which are hereby incorporated by reference). This allows location of the matched feature pairs between the IR image and the RGB image after normalising these images into the same colour space. With this affine transformation matrix, it is straightforward to scale up the IR image to the same size as the RGB image. As the RGB texture is already mapped onto the reconstructed mesh during the reconstruction process (e.g. as carried out by 3D SOM), a composition of functions can be used to map the corresponding IR pixels onto the 3D model (i.e., a composition of the affine transformation and the inheritance function used to map the RGB texture onto the mesh in the first place).

Preferably, the IR data mapped to a given polygon of the mesh is restricted to within a solid angle of 60 steradians around the surface normal of the polygon. Above 60 steradians, the geometry of the system (i.e. the position of the IR sensor in relation to the surface normal being imaged) has a big influence on the value being measured.

To restrict the solid angle range of IR image data used to generate IR texture data to be mapped to a given triangle in the mesh, the following steps are undertaken.

First, depth values of each triangle on the mesh are obtained. The depth value is the distance of a triangle mesh centre to the corresponding camera sensor centre. A depth map can then be created by projecting the depth value of the triangles to the images for each of the views of the 360 degree scan. For each triangle, the algorithm loops over the acquired IR images, each image being associated with a unique viewing angle. For each image, the depth map is used to check whether the current triangle is obscured by another triangle that is nearer to the sensor at the corresponding viewing angle. If the triangle is obscured, then the image is not used in the calculation of the IR texture data for that triangle.

Second, the images to be used to calculate the texture data for the triangle are determined on the basis of the surface orientation of the triangle. Images which have an orientation such that they lie within a 60 steradian solid angle about the triangle's surface orientation are located. Then, the projected intensities of the triangle in the respective images in that solid angle range are averaged to obtain the angle-limited IR texture data for the triangle. Once the texture data for all triangles have been calculated, they can be stored (for example, in a series of texture files) and appended to the 3D model file which contains the mesh data and the RGB texture data.

EXAMPLE 24 plant meshes were used to evaluate the segmentation methods described above. 6 different *Gossypium hirsutum* plants were studied. 4 plants were analysed at 4 time points. For each plant and each time-point, manual measurements of plant data such as stem length, leaf width and leaf length were performed manually. These manual measurements were used as ground truth in order to validate the accuracy of the segmentation and data extraction.

Images of the plants were captured using a high-resolution Pentax K10 camera with a sigma 20-40 mm aspherical lens. Each cotton plant pot was placed at the centre of a rotating tray over a calibration pattern. The calibration pattern, having known pattern size and spacings, was able to provide an indication of scale so that the final mesh coordinates were on the same scale as the manual measurements (in mm). The camera was fixed on a tripod during the entire acquisition process. The tray was manually rotated through 64 different angles and pictures were taken at each rotation angle. After the acquisition process finished, 64 images were available (for each plant and at each time-point) as input for multi-view 3D reconstruction. The image resolution was 3872×2592 (~10 million) pixels.

Multi-view 3D reconstruction was performed with 32 out of the 64 available images (at each time point and for each plant) as inputs to the reconstruction pipeline of 3DSOM (see A. Baumberg et al (2005) "3D SOM—A commercial software solution to 3D scanning", in *Graphical Models* 6$^{th}$ edition, vol 67, pp 476-495). The reconstruction pipeline of 3DSOM includes a pre-processing step that extracts the object of interest from the input images and calibrates the camera using a known pattern present in the image, in this case the calibration pattern over which the plant pots were placed. A "direct-intersection shape from silhouette" approach extracts the visual hull (maximum volume containing the object) from the images. A wiring-up algorithm is used to build the final reconstructed mesh using the visual hull vertices. The resolution of the reconstructed meshes fluctuates between 120000 and 270000 polygons.

Because the mesh coordinates obtained from 3DSOM were already on the same scale as the manual measurement units, no scaling was required and the relative error and squared difference could be calculated directly as:

$$\varepsilon_{a_i, m_i} = \frac{|a_i - m_i|}{m_i}; \quad (14)$$

$$\Delta^2_{a_i, m_i} = (a_i - m_i)^2. \quad (15)$$

Let $S_a = \{s_{a_1}, \ldots, s_{a_\Omega}\}$ and $S_m = \{s_{m_1}, \ldots, s_{m_\Omega}\}$ denote the sets of automated and manual main stem height measurements (with $\Omega$ number of plants). Let also $W_a = \{w_{a_1}, \ldots, w_{a_\phi}\}$ and $W_m = \{w_{m_1}, \ldots, w_{m_\phi}\}$ denote the sets of automated and manual leaf width measurements (with $\phi$ total number of leaves: 180). Using Eq. (14) and (15), the mean absolute percentage errors $E_s$, $E_w$, and the root mean square errors $RMSE_s$, $RMSE_w$ on the main stem height and leaf width measurements can be expressed by:

$$E_s = \frac{100 \times \sum_{i=1}^{i \leq \Omega} \varepsilon_{s_{a,i}, s_{m,i}}}{\Omega} \quad (16)$$

$$RMSE_s = \sqrt{\frac{\sum_{i=1}^{i \leq \Omega} \Delta^2_{s_{a,i}, s_{m,i}}}{\Omega}}$$

$$E_w = \frac{100 \times \sum_{i=1}^{i \leq \Phi} \varepsilon_{w_{a,i}, w_{m,i}}}{\Phi} \quad (17)$$

$$RMSE_w = \sqrt{\frac{\sum_{i=1}^{i \leq \Phi} \Delta^2_{w_{a,i}, w_{m,i}}}{\Phi}}$$

Analogous expressions allow computation of mean absolute percentage errors $E_l$ and RMS errors $RMSE_l$ for the leaf length measurements.

These errors were computed either using the whole datasets mentioned, or using the trimmed datasets with 10% outliers removed (i.e., the data points having the 5% best and 5% worst relative errors). In addition, to be able to test the correlation between the automated and manual measurements, we calculated the Pearson correlation coefficient, Ie, and the intra-class correlation coefficient, ICC. Methods for calculating these statistics are well known in the art and will not be reproduced here.

Experimental Results 384 phenotypic measurements were performed on the initial population of 24 *Gossypium hirsutum* plant meshes (24 main stem height measurements, and 180 measurements for each of leaf width and leaf length). Advantageously, the described methodology estimates plant phenotypic parameters with sufficient accuracy and reproducibility to be used as a surrogate for manual or destructive phenotypic analysis, as shown in Table 1 below.

TABLE 1

Main stem and leaf measurements analysis
Comparison between the automated and manual measurements

| | $|v_x|$ | $E_x$ | Range (mm) | $\sigma x$ | $E_{x,10\%}$ | $\sigma_{x,10\%}$ | $R^2_x$ | $ICC_x$ | $RMSE_x$ |
|---|---|---|---|---|---|---|---|---|---|
| Main Stem Height | 24 | 9.34% | 15.95 | 11.50% | 7.29% | 6.88% | 0.887 | 0.941 | 19.043 |
| Leaf Width | 180 | 5.75% | 5.11 | 6.40% | 4.78% | 3.20% | 0.957 | 0.974 | 7.287 |
| Leaf Length | 180 | 8.78% | 6.93 | 8.36% | 7.92% | 5.42% | 0.948 | 0.967 | 9.707 |

In Table 1, $|v_x|$ is the cardinality of $v_x$, $E_x$ and $E_{x,10\%}$ are respectively the non-trimmed and trimmed (10% extrema values removed) mean absolute percentage errors, and $\sigma_x$ and $\sigma_{x,10\%}$ are respectively the non-trimmed and trimmed standard deviations. $R^2_x$ is the squared Pearson correlation coefficient, $ICC_x$ is the intraclass correlation coefficient. $RMSE_x$ is the Root Mean Square Error.

Mean absolute percentage errors of $E_s \cong 9.34\%$ (15.9 mm with an average stem height of 170.9 mm), $E_w \cong 5.75\%$ (5.11 mm with an average leaf width of 88.9 mm), and $E_l \cong 8.78\%$ (6.93 mm with an average leaf length of 78.9 mm), on the main stem height, leaf width and leaf length measurements were computed. The root mean square errors computed were $RMSE_s \cong 19.043$ mm, $RMSE_w \cong 7.287$ mm, and $RMSE_l \cong 9.707$ mm. These values provide the average difference between the mesh based measurements and the direct measurements in millimeters.

Figure 15:
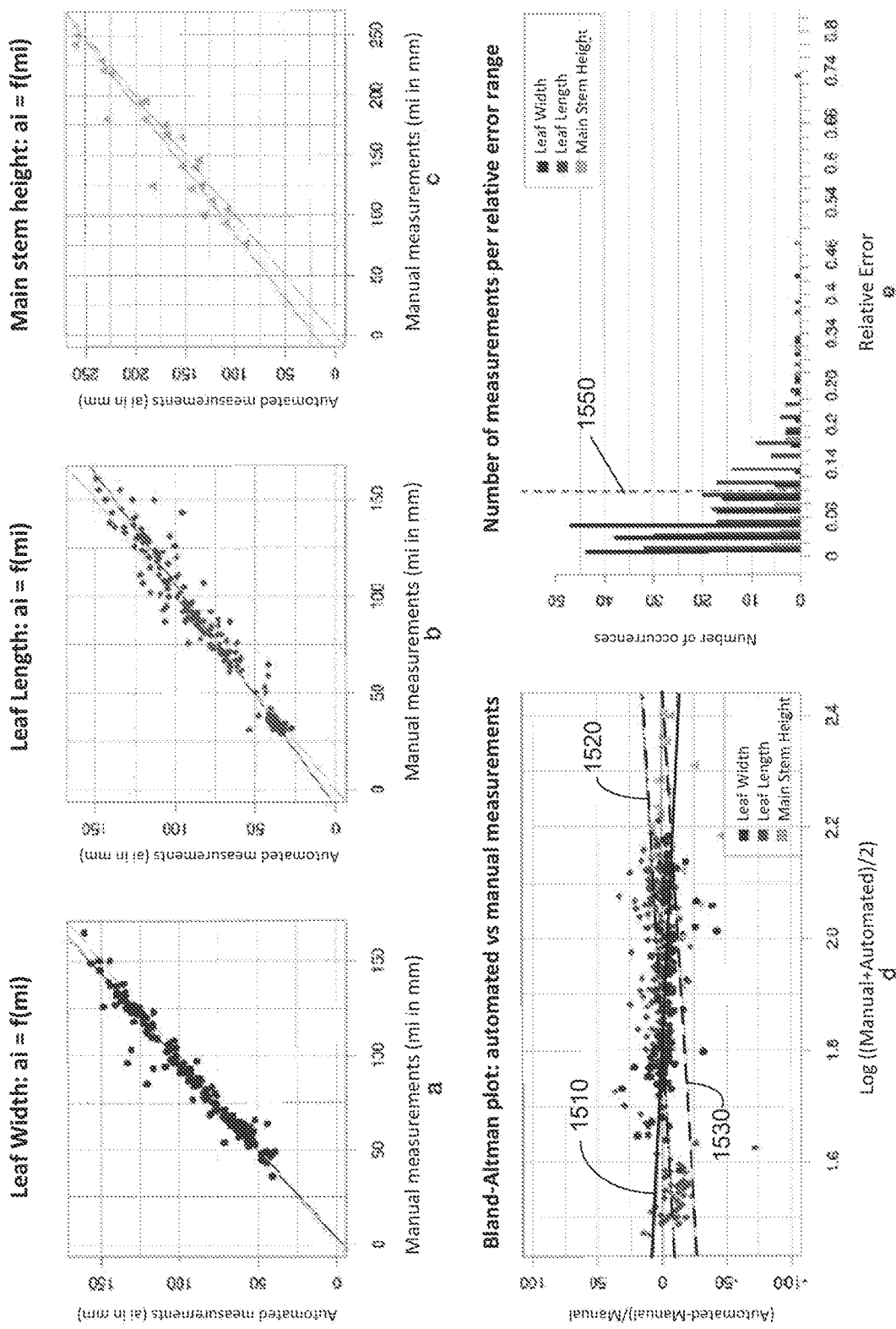
FIG. 15 shows results of an example in which: 15(a), 15(b), and 15(c) represent scatter plots of the different phenotypic parameters evaluated against manual measurements (the squared Pearson correlation and intra-class correlation coefficients computed for the main stem height, leaf width, and leaf length measurements were $R^2_w \cong 0.957$, $R^2_l \cong 0.948$, $R^2_s \cong 0.887$, $ICC_s \cong 0.941$, $ICC_w \cong 0.974$, $ICC_l \cong 0.967$; 15(d) is a Bland-Altman plot of the datasets of the example (i.e. the relative error against logarithm of the mean of two measurements); and 15(e) illustrates the distribution of the error for each measurement type, with the dotted line 1550 representing the 10% relative error.

The Bland-Altman plot and the distribution of the relative error, presented in FIGS. 15*d* and 15*e*, show that, even though most of the measurements were performed within an error range of [0%;10%] (see dotted line 1550 on FIG. 15e), many outliers remain in the analysis (vertical scattering on the Bland-Altman plot). The presence of outliers is caused by imprecision in the mesh segmentation and/or erroneous plant reconstructions due to occlusions during the 3D reconstruction. In FIG. 15d, line 1510 is the line of best fit to the relative error in leaf width, line 1520 the line of best fit to the relative error in leaf length, and line 1530 the line of best fit to the relative error in main stem height.

The scatter-plots and linear regressions displayed in FIGS. 15a and 15b provide an illustration of the strong correlations between the mesh-based and direct leaf measurements. The plotted point-clouds fall into slightly scattered lines and the linear regressions are approaching the targeted reference (i.e. y=x). The squared Pearson correlation and intraclass correlation coefficients $R^2_w \cong 0.957$, $ICC_w \cong 0.974$, $R^2_l \cong 0.948$, and $ICC_l \cong 0.967$ calculated on the leaf width and length measurements are very close to 1, emphasizing the correlation between the manual and automated measurements. Finally, although the plot of FIG. 15c shows a more scattered point-cloud for the main stem height measurements, the correlation coefficients found were $R^2_s \cong 0.887$ and $ICC_s \cong 0.941$, which are generally considered to be acceptable precisions.

The automated temporal analysis of the plants was quite robust to the two major challenges: the growth of the plants over time and the changes in the topology and shape of the leaves over time. Correct matches of the different plant organs occurred in 95% of the cases (missing petioles were ignored). A dependency of the current matching scheme is that an organ needs to be accurately identified in order to be matched.

The automated 3D analysis was performed on a standard computer equipped with an Intel Core 2 Duo E8300 processor (2.83 GHz). The mesh analysis involved an average execution time of 4.9 minutes and a total of 29.3 minutes for the complete analysis of six plants over four time-points (with plant meshes decimated to 70000 triangles and without algorithm optimisations outside standard speeding techniques). Table 2 provides the full analysis of the computational cost of our algorithm. From Table 2, it is noted that the higher the number of leaves, the longer is required to perform the analysis (due, to repeated leaf segmentations and data computations, e.g. Plant 2). The time required to perform the full mesh-based analysis (3D reconstruction excluded) is faster than any manual method can be, and the performed analysis provides additional information on the evolution of the data over-time.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A computer-implemented method of characterizing a phenotype of a plant, including:
 (i) obtaining mesh data representing a surface of the plant, said mesh data including data representing a plurality of polygons having respective sets of vertices, each vertex having a spatial coordinate; and
 (ii) applying at least two automated segmentations of progressively finer resolution to the mesh data to automatically assign the vertices to distinct morphological regions of the plant;
 wherein the distinct morphological regions include at least one primary region and one or more secondary regions;
 wherein the primary region is a main axis region; and
 wherein step (ii) includes:
 (iii) applying a first segmentation to the mesh data to generate first-pass segmentation data in which at least some vertices are assigned to the or each primary region, the first segmentation being performed using a first segmentation method; and
 (iv) applying at least one further segmentation to the first-pass segmentation data using at least one second segmentation method different from the first segmentation method, whereby a segmented mesh is obtained in which vertices remaining unassigned after step (iii) are assigned to one of the secondary regions.

2. A computer-implemented method according to claim 1, wherein the primary region is a stem region.

3. A computer-implemented method according to claim 2, wherein the secondary regions are composite regions.

4. A computer-implemented method according to claim 3, wherein the at least two segmentations include applying a

TABLE 2

Analysis of the computational cost (in minutes)

| Operation | Time-Point | Plant 1 | Plant 2 | Plant 3 | Plant 4 | Plant 5 | Plant 6 |
| --- | --- | --- | --- | --- | --- | --- | --- |
| Segmentation | T0 | 0.62 | 0.64 | 0.71 | 0.70 | 0.61 | 0.62 |
| | T1 | 0.64 | 0.62 | 0.57 | 0.51 | 0.55 | 0.81 |
| | T2 | 0.71 | 0.69 | 0.52 | 0.68 | 0.65 | 0.60 |
| | T3 | 0.68 | 0.62 | 0.67 | 0.80 | 0.71 | 0.81 |
| Phenotype data extraction | T0 | 0.075 | 0.065 | 0.082 | 0.073 | 0.074 | 0.078 |
| | T1 | 0.067 | 0.066 | 0.075 | 0.062 | 0.074 | 0.074 |
| | T2 | 0.072 | 0.068 | 0.061 | 0.063 | 0.068 | 0.067 |
| | T3 | 0.073 | 0.072 | 0.071 | 0.076 | 0.071 | 0.071 |
| Temporal organs matching | | 2.21 | 2.51 | 2.16 | 2.01 | 2.05 | 2.12 |
| Complete analysis | | 4.97 | 5.19 | 4.65 | 4.77 | 4.67 | 5.06 | primitive shape-fitting to the primary region to define a boundary for the primary region.

5. A computer-implemented method according to claim 4, wherein the boundary is tubular.

6. A computer-implemented method according to claim 5, wherein vertices lying outside the boundary are assigned to an uncategorized region.

7. A computer-implemented method according to claim 6, including segmenting the primary region into parts.

8. A computer-implemented method according to claim 7, wherein the parts are internodes of a stem region.

9. A computer-implemented method according to claim 8, including defining junctions between the parts.

10. A computer-implemented method according to claim 9, wherein the junctions are nodes.

11. A computer-implemented method according to claim 10, wherein the junctions are defined using vertices of the uncategorized region.

12. A computer-implemented method according to claim 3, wherein the at least one further segmentation includes applying a primitive shape-fitting to each composite region.

13. A computer-implemented method according to claim 12, wherein the composite regions include leaf-branch composite regions.

14. A computer-implemented method according to claim 13, wherein the primitive shape is tubular to define an initial boundary for a branch sub-region of the leaf-branch composite region.

15. A computer-implemented method according to claim 14, wherein vertices of the leaf-branch composite region are assigned to:
   i. the branch sub-region, if they lie within the initial boundary and within a predetermined distance of the primary region; or
   ii. a leaf sub-region, otherwise.

16. A computer-implemented method according to claim 15, wherein the at least one further segmentation includes, for each leaf sub-region, applying at least one leaf segmentation to divide the leaf sub-region into two or more leaf sub-sections.

17. A computer-implemented method according to claim 16, wherein the at least one leaf segmentation includes a sagittal leaf segmentation and a transverse leaf segmentation.

18. A computer-implemented method according to claim 16, wherein the leaf segmentation includes estimating an axis of symmetry of the leaf sub-region.

19. A computer-implemented method according to claim 16, including measuring the quality of the leaf segmentation.

20. A computer-implemented method according to claim 1, wherein at least one secondary region is generated during the first segmentation.

21. A computer-implemented method according to claim 20, wherein the at least one secondary region is or are generated by region growing.

22. A computer-implemented method according to claim 6, including post-processing the segmented mesh to assign vertices of the uncategorized region to one of the secondary regions.

23. A computer-implemented method according to claim 1, including post-processing the segmented mesh to assign isolated vertices to one of the secondary regions.

24. A computer-implemented method according to claim 1, wherein the mesh data include texture data representing reflectance from the surface of the plant at one or more wavelengths or in one or more wavelength bands.

25. A computer-implemented method according to claim 24, wherein the texture data are generated using one or more of the following: RGB imaging data, infrared imaging data, or spectral imaging data.

26. A computer-implemented method according to claim 1, comprising:
   generating segmented mesh data representing the segmented mesh, said segmented mesh data including data representing a plurality of polygons having respective sets of vertices, each vertex having a spatial coordinate and a label representing a distinct morphological region of the plant; and
   using the spatial coordinates of the vertices, calculating one or more phenotypic parameters for at least one of the distinct morphological regions.

27. A computer-implemented method according to claim 26, wherein the phenotypic parameters include one or more of leaf width, leaf area, stem length, stem inclination, branch initiation angle, or branch length.

28. A computer-implemented method of measuring time-variation of phenotypic parameters of a plant, including:
   obtaining two or more segmented meshes, each segmented mesh including mesh data representing a surface of the plant at a given time point, said mesh data including data representing a plurality of polygons having respective sets of vertices, each vertex having a spatial coordinate and a label representing a distinct morphological region of the plant;
   determining a time order for the segmented meshes according to time data associated with the segmented meshes;
   aligning successive ones of the two or more meshes;
   matching morphological regions of the plant at pairs of successive time points; and
   calculating one or more phenotypic parameters for at least one of the morphological regions, thereby generating phenotype data for the one or more phenotypic parameters as a function of time.

29. A computer-implemented method according to claim 28, wherein said aligning includes aligning centres of the successive ones of the two or more segmented meshes.

30. A computer-implemented method according to claim 28, wherein said aligning includes rotational alignment of the successive ones of the two or more segmented meshes.

31. A computer-implemented method according to claim 30, wherein said rotational alignment includes minimising a statistic which summarises distances between matched morphological regions.

32. A computer-implemented method according to claim 28, wherein said segmented meshes are generated by a computer-implemented method of characterizing the phenotype of a plant, including:
   i. obtaining mesh data representing a surface of the plant, said mesh data including data representing a plurality of polygons having respective sets of vertices, each vertex having a spatial coordinate; and
   ii. applying at least two segmentations of progressively finer resolution to the mesh data to assign the vertices to distinct morphological regions of the plant.

33. A computer-readable non-transitory storage medium having stored thereon processor-executable instructions that, when executed by a processor, cause the processor to execute the computer-implemented method of claim 1.

34. A computer system including at least one processor configured to execute the computer-implemented method of claim 1.

35. A system for characterizing a phenotype of a plant, including:
- at least one processor;
- data storage in communication with the at least one processor, the data storage having stored thereon mesh data representing a surface of the plant, said mesh data including data representing a plurality of polygons having respective sets of vertices, each vertex having a spatial coordinate; and
- a mesh segmentation module implemented by software executed entirely or in part by a computer and/or at least one dedicated hardware component which configures the at least one processor to:
  - (i) apply at least two segmentations of progressively finer resolution to the mesh data to assign the vertices to distinct morphological regions of the plant, wherein the distinct morphological regions include at least one primary region and one or more secondary regions, the primary region is a main axis region;
  - (ii) apply a first segmentation to the mesh data to generate first-pass segmentation data in which at least some vertices are assigned to the or each primary region, the first segmentation being performed using a first segmentation method; and
  - (iii) apply at least one further segmentation to the first-pass segmentation data using at least one second segmentation method different from the first segmentation method, whereby a segmented mesh is obtained in which vertices remaining unassigned in the first-pass segmentation data are assigned to one of the secondary regions.

36. A system according to claim 35, further including a phenotype parameter module implemented by software executed entirely or in part by a computer and/or at least one dedicated hardware component which configures the at least one processor to calculate one or more phenotypic parameters for at least one of the distinct morphological regions, using the spatial coordinates of the vertices.

37. A system for characterizing a phenotype of a plant, comprising:
- at least one processor;
- data storage in communication with the at least one processor, the data storage having stored thereon mesh data representing the surface of the plant, said mesh data including data representing a plurality of polygons having respective sets of vertices, each vertex having a spatial coordinate; and
- a mesh segmentation module implemented by software executed entirely or in part by a computer and/or at least one dedicated hardware component which configures the at least one processor to apply at least two segmentations of progressively finer resolution to the mesh data to assign the vertices to distinct morphological regions of the plant, wherein the mesh data include two or more meshes, each mesh representing the surface of the plant at a given time; wherein the mesh segmentation module configures the at least one processor to apply the at least two segmentations to each mesh; and wherein the system further includes a plant parts matching module implemented by software executed entirely or in part by a computer and/or at least one dedicated hardware component which configures the at least one processor to:
- determine a time order for the segmented meshes according to time data associated with the segmented meshes;
- align successive ones of the two or more meshes;
- match morphological regions of the plant at pairs of successive time points; and
- calculate one or more phenotypic parameters for at least one of the morphological regions, thereby generating phenotype data for the one or more phenotypic parameters as a function of time.

* * * * *

UNITED STATES PATENT AND TRADEMARK OFFICE
CERTIFICATE OF CORRECTION

PATENT NO. : 9,741,128 B2
APPLICATION NO. : 14/362977
DATED : August 22, 2017
INVENTOR(S) : Xavier Raymond Richard Sirault et al.

Page 1 of 1

It is certified that error appears in the above-identified patent and that said Letters Patent is hereby corrected as shown below:

On the Title Page

Item (54) in the title, and in the Specification, Line 1 Replace "PLAN" with --PLANT--.

Signed and Sealed this
Third Day of April, 2018

Andrei Iancu
*Director of the United States Patent and Trademark Office*